United States Patent
Sheppard et al.

(10) Patent No.: US 11,887,132 B2
(45) Date of Patent: *Jan. 30, 2024

(54) PROCESSOR SYSTEMS TO ESTIMATE AUDIENCE SIZES AND IMPRESSION COUNTS FOR DIFFERENT FREQUENCY INTERVALS

(71) Applicant: The Nielsen Company (US), LLC, New York, NY (US)

(72) Inventors: Michael Sheppard, Holland, MI (US); Ludo Daemen, Duffel (BE); PengFei Yi, Shanghai (CN); Jonathan Sullivan, Hurricane, UT (US); Rachel Worth Olson, Schaumburg, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,199

(22) Filed: Jul. 25, 2022

(65) Prior Publication Data

US 2022/0368969 A1 Nov. 17, 2022

Related U.S. Application Data

(63) Continuation of application No. 16/373,257, filed on Apr. 2, 2019, now Pat. No. 11,397,965, which is a (Continued)

(51) Int. Cl.
*G06Q 30/0201* (2023.01)
*G06Q 30/0203* (2023.01)
(Continued)

(52) U.S. Cl.
CPC ......... *G06Q 30/0201* (2013.01); *G06F 17/18* (2013.01); *G06Q 30/0203* (2013.01);
(Continued)

(58) Field of Classification Search
CPC .......... G06Q 30/0201; G06Q 30/0203; G06Q 30/0242; G06Q 30/0246; G06Q 30/02;
(Continued)

(56) References Cited

U.S. PATENT DOCUMENTS

| 6,108,637 A | 8/2000 | Blumenau |
| 6,459,808 B1 | 10/2002 | Brand |

(Continued)

FOREIGN PATENT DOCUMENTS

| CN | 104427359 | 3/2015 |
| CN | 104584564 | 4/2015 |

(Continued)

OTHER PUBLICATIONS

Parkash et al, Two New Weighted Divergence Measures in Probability Spaces, Oct. 26, 2017, International Journal of Pure and Applied Mathematics, vol. 113, No. 3, p. 643-653. (Year: 2017).*

(Continued)

*Primary Examiner* — Marie P Brady

(57) ABSTRACT

Processor systems to estimate audience sizes and impression counts for different frequency intervals are disclosed. An example processor system includes a memory management unit (MMU) to assign requests from computing devices indicative of accesses to media to a first block of memory and to assign user-identified impression data corresponding to user-identified impressions to a second block of memory. The processor system including an arithmetic logic unit (ALU) to determine multipliers relating a first probability distribution for the user-identified impressions to a second probability distribution for census impressions. The multipliers based on probability constraints defined by weighted probabilities associated with the second probability distribution, where different ones of the probabilities weighted based on estimated populations for corresponding ones of (Continued)

the different demographics. The ALU to determine a plurality of census impression counts associated with the census impressions based on the multipliers.

21 Claims, 8 Drawing Sheets

Related U.S. Application Data continuation-in-part of application No. 16/074,408, filed as application No. PCT/CN2018/081632 on Apr. 2, 2018, now abandoned.

(51) Int. Cl.
| | |
|---|---|
| G06Q 30/0242 | (2023.01) |
| H04N 21/2343 | (2011.01) |
| H04N 21/258 | (2011.01) |
| H04N 21/4728 | (2011.01) |
| G06F 17/18 | (2006.01) |
| H04L 67/54 | (2022.01) |
| H04L 67/50 | (2022.01) |

(52) U.S. Cl.
CPC ..... *G06Q 30/0242* (2013.01); *G06Q 30/0246* (2013.01); *H04L 67/535* (2022.05); *H04L 67/54* (2022.05); *H04N 21/2343* (2013.01); *H04N 21/25883* (2013.01); *H04N 21/4728* (2013.01)

(58) Field of Classification Search
CPC ....... G06F 17/18; H04L 67/535; H04L 67/54; H04N 21/2343; H04N 21/25883; H04N 21/4728
See application file for complete search history.

(56) References Cited

U.S. PATENT DOCUMENTS

| | | | |
|---|---|---|---|
| 6,959,300 | B1 | 10/2005 | Caldwell et al. |
| 7,107,192 | B1 | 9/2006 | Cung et al. |
| 8,364,525 | B2 | 1/2013 | Kothiwal et al. |
| 8,370,489 | B2 | 2/2013 | Mazumdar et al. |
| 8,386,599 | B2 | 2/2013 | Fomitchev |
| 8,874,652 | B1 | 10/2014 | Pecjak et al. |
| 8,973,023 | B1 | 3/2015 | Rao et al. |
| 9,117,227 | B1 | 8/2015 | Agrawal et al. |
| 9,118,542 | B2 | 8/2015 | Srivastava et al. |
| 9,224,094 | B2 | 12/2015 | Oliver et al. |
| 9,236,962 | B2 | 1/2016 | Hawkins et al. |
| 9,497,090 | B2* | 11/2016 | Srivastava ......... G06Q 30/0241 |
| 9,800,928 | B2 | 10/2017 | Sheppard et al. |
| 11,397,965 | B2 | 7/2022 | Sheppard et al. |
| 2003/0004781 | A1 | 1/2003 | Mallon et al. |
| 2005/0246358 | A1 | 11/2005 | Gross |
| 2008/0250033 | A1 | 10/2008 | Agarwal et al. |
| 2009/0307084 | A1 | 12/2009 | Monighetti et al. |
| 2010/0088714 | A1* | 4/2010 | Hawkins ................ H04H 20/14 725/14 |
| 2011/0196733 | A1* | 8/2011 | Li ........................ G06Q 30/02 705/14.42 |
| 2011/0196739 | A1 | 8/2011 | Zhang et al. |
| 2011/0251823 | A1* | 10/2011 | Davis ..................... G06Q 30/02 702/181 |
| 2012/0072469 | A1 | 3/2012 | Perez et al. |
| 2013/0198125 | A1* | 8/2013 | Oliver ............... G06Q 30/0204 706/46 |
| 2014/0081703 | A1* | 3/2014 | Palit .................. G06Q 30/0201 705/7.29 |
| 2014/0095320 | A1 | 4/2014 | Sivaramakrishnan et al. |
| 2014/0325551 | A1* | 10/2014 | McMillan ........ H04N 21/25883 725/20 |
| 2014/0337104 | A1 | 11/2014 | Splaine et al. |
| 2015/0193813 | A1 | 7/2015 | Toupet et al. |
| 2015/0262207 | A1* | 9/2015 | Rao ..................... G06Q 30/0242 705/7.32 |
| 2016/0019580 | A1 | 1/2016 | Rao et al. |
| 2016/0162955 | A1 | 6/2016 | O'Kelley et al. |
| 2016/0188606 | A1 | 6/2016 | Bandyopadhyay et al. |
| 2016/0189182 | A1 | 6/2016 | Sullivan et al. |
| 2016/0191970 | A1 | 6/2016 | Sheppard et al. |
| 2016/0379246 | A1 | 12/2016 | Sheppard et al. |
| 2017/0004526 | A1 | 1/2017 | Morovati et al. |
| 2017/0061470 | A1* | 3/2017 | Sheppard ........... G06Q 30/0242 |
| 2017/0339460 | A1 | 11/2017 | Sullivan et al. |
| 2018/0063583 | A1 | 3/2018 | Sheppard et al. |
| 2018/0315060 | A1* | 11/2018 | Sheppard ........... G06Q 30/0203 |
| 2019/0147461 | A1 | 5/2019 | Sheppard et al. |
| 2019/0304205 | A1 | 10/2019 | Sheppard et al. |
| 2020/0007919 | A1 | 1/2020 | Sheppard et al. |
| 2020/0294069 | A1 | 9/2020 | Sheppard et al. |
| 2021/0065231 | A1 | 3/2021 | Sheppard et al. |
| 2021/0158391 | A1 | 5/2021 | Sheppard et al. |
| 2022/0058688 | A1 | 2/2022 | Sheppard et al. |

FOREIGN PATENT DOCUMENTS

| | | |
|---|---|---|
| CN | 106156363 | 11/2016 |
| CN | 106375796 | 2/2017 |
| WO | WO2011084779 | 7/2011 |

OTHER PUBLICATIONS

United States Patent and Trademark Office, "Non-Final Office Action," dated Mar. 14, 2023 in connection with U.S. Appl. No. 15/812,768, 11 pages.

Brauer, "Next Generation Audience Measurement," Online Nielsen, Jun. 2011, 8 pages.

Cohen, "Audience Measurement: Five Media Factors to Consider," Dec. 15, 2008, retrieved from URL<https://www.clickz.com/audience-measurement-five-media-factors-to-consider/76442/>, retrieved on Apr. 16, 2021, 11 pages.

European Patent Office, "Communication pursuant to Rules 161(2) and 162 EPC," issued in connection with European Patent Application No. 18913269.9 dated Nov. 10, 2020, 3 pages.

European Patent Office, "Communication Pursuant to Rules 70(2) and 70a(2) EPC," issued in connection with European patent application No. 18913269.9 dated Nov. 23, 2021, 1 page.

European Patent Office, "Extended Search Report," issued in connection with European patent application No. 18913269.9 dated Nov. 5, 2021, 10 pages.

Facebook, "Controlling frequency on Facebook" retrieved from https://www.facebook.com/business/m/one-sheeters/controlling-frequency-on-facebook on Sep. 30, 2019, (6 pages).

Goosey, "Advanced Techniques in Panel and Server Data Integration," ESOMAR/ARF WAM Conference—Online, Jun. 2005, 16 pages.

International Searching Authority, "International Preliminary Report on Patentability," issued in connection with PCT patent application No. PCT/CN2016/110313, dated Jun. 18, 2019, 4 pages.

International Searching Authority, "International Preliminary Report on Patentability," issued in connection with PCT patent application No. PCT/CN2018/081632, dated Oct. 6, 2020 5 pages.

International Searching Authority, "International Search Report and Written Opinion," issued in connection with international application No. PCT/CN2016/110313, dated Sep. 18, 2017, 12 pages.

International Searching Authority, "International Search Report and Written Opinion," issued in connection with International Application No. PCT/CN2018/081632, dated Jan. 9, 2019, 9 pages.

Kapur et al., "Entropy Optimization Principles and their Applications," Entropy and Energy Dissipation in Water Resources, V.P. Singh and M. Florentino (editors), Kluwer Academic Publishers, pp. 3-20, 1992 (18 pages).

Kapur et al., "Entropy Optimization Principles and their applications," in Entropy and Energy Dissipation in Water Resources V.P. Singh and M. Florentino (eds.), Kluwer Academic Publishers, p. 3-20, 1992, (18 pages).

(56) References Cited

OTHER PUBLICATIONS

Kesavan et al., "The Generalized Maximum Entropy Principle," IEEE Transactions on Systems, Man, and Cybernetics, vol. 19, No. 5, Sep./Oct. 1989 (11 pages).

Kesavan et al., "The Generalized Maximum Entropy Principle," in IEEE Transactions on Systems, Man, and Cybernetics, vol. 19, No. 5, pp. 1042-1052, Sep.-Oct. 1989. (11 pages).

Oliver et al., "Online Hybrid Audience Measurement Methodology," Expired U.S. Appl. No. 61/591,263, filed Jan. 26, 2012, 80 pages.

Osborn, "Inside Nielsen's Videocensus Methodology," Insights, Jun. 5, 2009, 3 pages.

Osborn, Dave, "Inside Nielsen's Videocensus Methodology," available at https://www.nielsen.com/us/en/insights/article/2009/inside-nielsens-videocensus-methodology/, Jun. 5, 2009, 3 pages.

Sukittanon et al., "Modulation Scale Analysis for Content Identification," UWEE Technical Report No. UWEETR-2003-0025, Nov. 1, 2003, 12 pages.

United States Patent and Trademark Office, "Corrected Notice of Allowance," issued in connection with U.S. Appl. No. 16/373,257, dated Apr. 11, 2022, 10 pages.

United States Patent and Trademark Office, "Examiner's Answer," issued in connection with U.S. Appl. No. 15/812,768, dated Aug. 20, 2021, 11 pages.

United States Patent and Trademark Office, "Final Office Action," issued in connection with U.S. Appl. No. 15/551,586 dated Jul. 27, 2020, 45 pages.

United States Patent and Trademark Office, "Final Office Action," issued in connection with U.S. Appl. No. 15/551,586, dated Apr. 21, 2021, 34 pages.

United States Patent and Trademark Office, "Final Office Action," issued in connection with U.S. Appl. No. 15/812,768 dated Sep. 18, 2020, 12 pages.

United States Patent and Trademark Office, "Final Office Action," issued in connection with U.S. Appl. No. 16/074,408, dated Jul. 8, 2022, 17 pages.

United States Patent and Trademark Office, "Final Office Action," issued in connection with U.S. Appl. No. 16/074,408, dated Oct. 27, 2021, 14 pages.

United States Patent and Trademark Office, "Final Office Action," dated Jul. 27, 2020 in connection with U.S. Appl. No. 15/551,586 (45 pages).

United States Patent and Trademark Office, "Final Rejection," issued in connection with U.S. Appl. No. 16/373,257, dated Oct. 29, 2021, 17 pages.

United States Patent and Trademark Office, "Non Final Office Action," issued in connection with U.S. Appl. No. 16/074,408, dated Jun. 9, 2021, 17 pages.

United States Patent and Trademark Office, "Non Final Office Action," issued in connection with U.S. Appl. No. 16/074,408, dated Mar. 18, 2022, 17 pages.

United States Patent and Trademark Office, "Non-Final Office Action" issued in connection with U.S. Appl. No. 15/551,586 dated Sep. 5, 2019, 21 pages.

United States Patent and Trademark Office, "Non-Final Office Action", issued in connection with U.S. Appl. No. 15/551,586, dated Feb. 26, 2020, 37 pages.

United States Patent and Trademark Office, "Non-Final Office Action," dated Dec. 3, 2020 in connection with U.S. Appl. No. 15/551,586 (32 pages).

United States Patent and Trademark Office, "Non-Final Office Action," dated Feb. 26, 2020 in connection with U.S. Appl. No. 15/551,586 (37 pages).

United States Patent and Trademark Office, "Non-Final Office Action," issued in connection with U.S. Appl. No. 15/551,586 dated Dec. 3, 2020, 32 pages.

United States Patent and Trademark Office, "Non-Final Office Action," issued in connection with U.S. Appl. No. 15/812,768 dated Dec. 4, 2019, 38 pages.

United States Patent and Trademark Office, "Non-Final Office Action," issued in connection with U.S. Appl. No. 16/373,257, dated Jun. 3, 2021, 22 pages.

United States Patent and Trademark Office, "Notice of Allowance and Fee(s) Due," issued in connection with U.S. Appl. No. 16/373,257, dated Mar. 22, 2022, 14 pages.

United States Patent and Trademark Office, "Restriction Requirement," dated Dec. 14, 2020 in connection with U.S. Appl. No. 16/373,257 (6 pages).

United States Patent and Trademark Office, "Supplemental Notice of Allowance," issued in connection with U.S. Appl. No. 16/373,257, dated Apr. 28, 2022, 2 pages.

United States Patent and Trademark Office, "Decision on Appeal," issued in connection with U.S. Appl. No. 15/812,768, issued on Dec. 29, 2022, 12 pages.

* cited by examiner

| FREQUENCY INTERVAL (LB – UB) | DEMOGRAPHIC 1 | | DEMOGRAPHIC 2 | |
|---|---|---|---|---|
| | IMPRESSIONS (R) | UNIQUE AUDIENCE SIZE (A) | IMPRESSIONS (R) | UNIQUE AUDIENCE SIZE (A) |
| 1 – 9 | 1,789 | 451 | 2,884 | 716 |
| 10 – 24 | 3,560 | 231 | 7,242 | 458 |
| 25 + | 7,353 | 176 | 13,447 | 335 |
| TOTAL | 12,702 | 858 | 23,603 | 1,509 |

USER-IDENTIFIED AUDIENCE MEASUREMENT DATA

FIG. 3

| TOTAL UNIVERSE ESTIMATE | DEMOGRAPHIC 1 UNIVERSE ESTIMATE | DEMOGRAPHIC 2 UNIVERSE ESTIMATE | CENSUS IMPRESSIONS |
|---|---|---|---|
| 3,000 | 1,000 | 2,000 | 45,000 |

CENSUS AUDIENCE MEASUREMENT DATA

FIG. 4

| FREQUENCY INTERVAL (LB – UB) | DEMOGRAPHIC 1 | | DEMOGRAPHIC 2 | |
|---|---|---|---|---|
| | IMPRESSIONS (T) | UNIQUE AUDIENCE SIZE (X) | IMPRESSIONS (T) | UNIQUE AUDIENCE SIZE (X) |
| 1 – 9 | 1,646 | 409 | 2,682 | 656 |
| 10 – 24 | 3,645 | 234 | 7,520 | 470 |
| 25 + | 10,547 | 233 | 18,960 | 441 |
| TOTAL | 15,838 | 876 | 29,162 | 1,567 |

ESTIMATED CENSUS INFORMATION

FIG. 5

PROCESSOR SYSTEMS TO ESTIMATE AUDIENCE SIZES AND IMPRESSION COUNTS FOR DIFFERENT FREQUENCY INTERVALS

RELATED APPLICATIONS

This patent arises from a continuation of U.S. patent application Ser. No. 16/373,257, which was filed on Apr. 2, 2019, which was a continuation-in-part of U.S. patent application Ser. No. 16/074,408, which was filed on Jul. 31, 2018 as a national stage application of International Application No. PCT/CN2018/081632 filed on Apr. 2, 2018. U.S. patent application Ser. No. 16/373,257, U.S. patent application Ser. No. 16/074,408, and International Application No. PCT/CN2018/081632 are incorporated herein by reference in their entireties. Priority to U.S. patent application Ser. No. 16/373,257, U.S. patent application Ser. No. 16/074,408, and International Application No. PCT/CN2018/081632 is claimed.

FIELD OF THE DISCLOSURE

This disclosure relates generally to processor systems, and, more particularly, to adapting processor system operations to estimate audience sizes and impression counts for different frequency intervals.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the audience measurement entity can determine exposure metrics for different media based on the collected media measurement data.

BRIEF DESCRIPTION OF THE DRAWINGS

FIG. 3 is a table of example user-identified audience measurement data.

FIG. 4 is a table of example census audience measurement data.

FIG. 5 is a table of example estimated census data determined based on the audience measurement data of FIGS. 3 and 4.

DETAILED DESCRIPTION

Figure 1A:
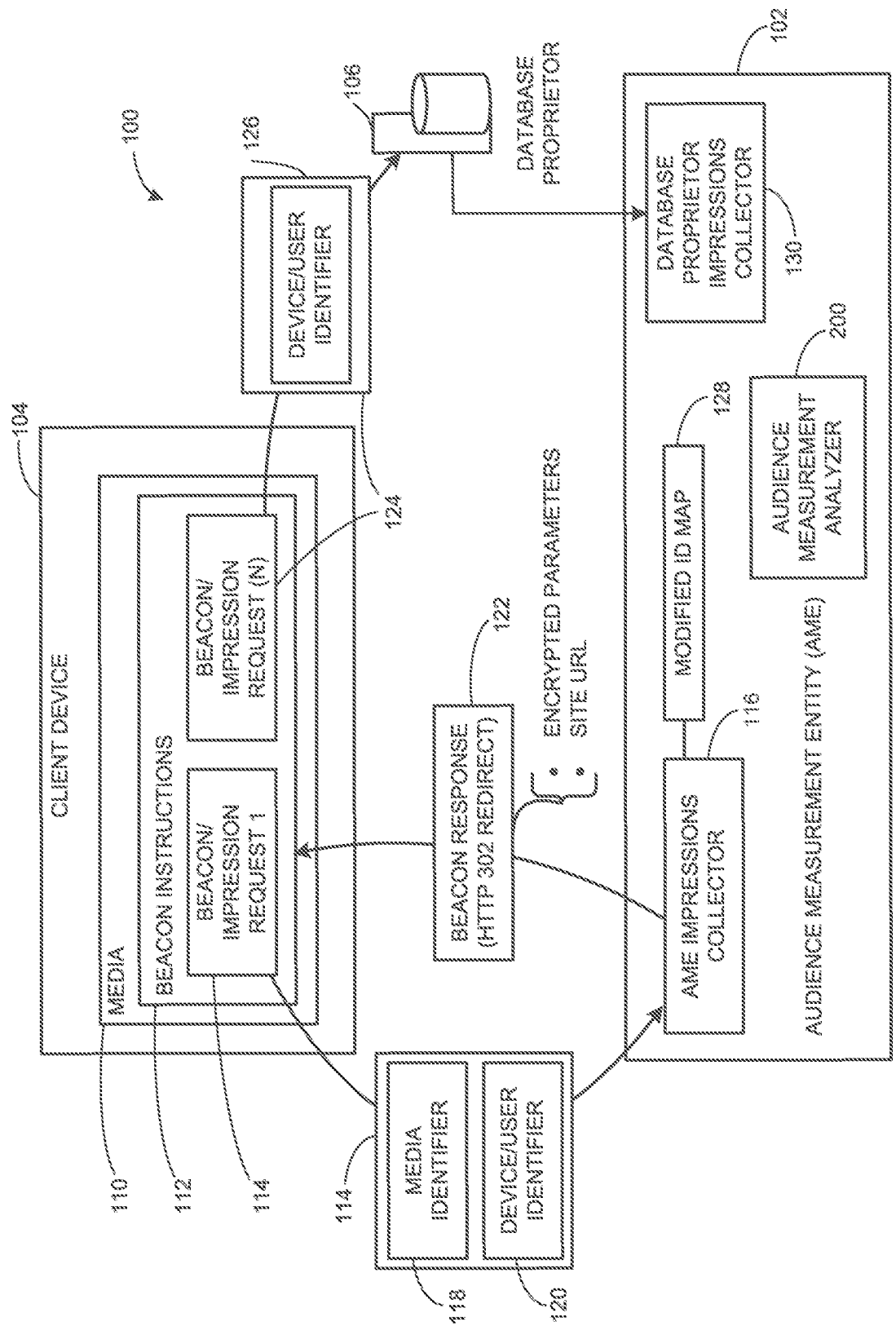
FIG. 1A illustrates an example communication flow diagram of an example manner in which an audience measurement entity (AME) can collect impressions and/or demographic information associated with audience members exposed to media.

AMEs usually collect large amounts of audience measurement information from their panelists including the number of unique audience members for particular media and the number of impressions corresponding to each of the audience members. Unique audience size, as used herein, refers to the total number of unique people (e.g., non-duplicate people) who had an impression of (e.g., were exposed to) a particular media item, without counting duplicate audience members. Impression count, as used herein, refers to the number of times audience members are exposed to a particular media item. The unique audience size associated with a particular media item will always be equal to or less than the number of impressions associated the media item because, while all audience members by definition have at least one impression of the media, one or more of the audience members may have more than one impression. That is, the unique audience size is equal to the impression count only when every audience member was exposed to the media a single time (i.e., the number of audience members equals the number of impressions). Where at least one audience member is exposed to the media multiple times, the unique audience size will be less than the total impression count because multiple impressions will be associated with individual audience members.

The number of times a particular audience member is exposed to a media item within a specified time period or duration is referred to as the impression frequency or simply, frequency. Thus, if each of six people is exposed to a particular advertisement once during a particular period and each of four other people is exposed to the same advertisement twice during the same period, the impression frequency for each of the first six people would be one while the impression frequency for each of the latter four people would be two. The impression count for the particular advertisement during a particular duration can be derived by multiplying each frequency value by the unique audience size corresponding to that frequency to generate a product for each frequency, and summing the products. Thus, in the above example, the impression frequency of one multiplied by the six unique audience members plus the impression frequency of two multiplied by the four unique audience members results in 1×6+2×4=14 total impressions for the advertisement with the total unique audience size being 6+4=10.

Techniques have been developed to enable AMEs to track impressions of Internet-based media (e.g., web pages, online advertisements, and/or other media). For example, the inventions disclosed in Blumenau, U.S. Pat. No. 6,108,637, which is hereby incorporated herein by reference in its entirety, involve a technique wherein Internet media to be tracked is tagged with beacon instructions. In particular, monitoring instructions are associated with the Hypertext Markup Language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media (e.g., the occurrence of a media impression) to be sent from the client that downloaded the media to a monitoring entity. Typically, the monitoring entity is an AME (e.g., any entity interested in measuring or tracking audience exposures to advertisements, media, and/or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is associated with a panelist of the AME. In this manner, the AME is able to track every time a person is exposed to the media on a census-wide or population-wide level. As a result, the AME can reliably determine the total impression count for the media without having to extrapolate from panel data collected from a relatively limited pool of panelists within the population.

Tracking impressions by tagging media with beacon instructions in this manner is insufficient, by itself, to enable an AME to reliably determine the unique audience size associated with the media or the impression frequency associated with the audience members. The unique audience size and impression frequency cannot be determined because the collected monitoring information does not uniquely identify the person(s) exposed to the media. That is, the AME cannot determine whether two reported impressions are associated with the same person or two separate people. The AME may set a cookie on the client devices reporting the monitoring information to identify when multiple impressions occur using the same device. However, cookie information does not indicate whether the same person used the client in connection with each media impression. Furthermore, the same person may access media using multiple different devices that have different cookies so that the AME cannot directly determine when two separate impressions are associated with the same person or two different people.

Furthermore, the monitoring information reported by a client executing the beacon instructions does not provide an indication of the demographics or other user information associated with the person(s) exposed to the associated media. To at least partially address this issue, the AME establishes a panel of users who have agreed to provide their demographic information and to have their Internet browsing activities monitored. When an individual joins the panel, they provide detailed information concerning their identity and demographics (e.g., gender, race, income, home location, occupation, etc.) to the AME. The AME sets a cookie on the panelist computer that enables the AME to identify the panelist whenever the panelist accesses tagged media and, thus, sends monitoring information to the AME. Since most of the client devices providing monitoring information from the tagged pages are not panelists and, thus, are unknown to the AME, it is necessary to use statistical methods to impute demographic information based on the data collected for panelists to the larger population of users providing data for the tagged media. However, panel sizes of AMEs remain small compared to the general population of users. Thus, a problem is presented as to how to increase panel sizes while ensuring the demographics data of the panel is accurate.

There are many database proprietors operating on the Internet. These database proprietors provide services (e.g., social networking services, email services, media access services, etc.) to large numbers of subscribers. In exchange for the provision of such services, the subscribers register with the proprietors. As part of this registration, the subscribers provide detailed demographic information. Examples of such database proprietors include social network providers such as Facebook, Myspace, Twitter, etc. These database proprietors set cookies on the computers of their subscribers to enable the database proprietors to recognize registered users when such registered users visit their websites.

Unlike traditional media measurement techniques in which AMEs rely solely on their own panel member data to collect demographics-based audience measurement, example methods, apparatus, and/or articles of manufacture disclosed herein enable an AME to share demographic information with other entities that operate based on user registration models. As used herein, a user registration model is a model in which users subscribe to services of those entities by creating an account and providing demographic-related information about themselves. Sharing of demographic information associated with registered users of database proprietors enables an AME to extend or supplement their panel data with substantially reliable demographics information from external sources (e.g., database proprietors), thus extending the coverage, accuracy, and/or completeness of their demographics-based audience measurements. Such access also enables the AME to monitor persons who would not otherwise have joined an AME panel. Any web service provider entity having a database identifying demographics of a set of individuals may cooperate with the AME. Such entities may be referred to as "database proprietors" and include entities such as wireless service carriers, mobile software/service providers, social medium sites (e.g., Facebook, Twitter, MySpace, etc.), online retailer sites (e.g., Amazon.com, Buy.com, etc.), multi-service sites (e.g., Yahoo!, Google, Experian, etc.), and/or any other Internet sites that collect demographic data of users and/or otherwise maintain user registration records.

The use of demographic information from disparate data sources (e.g., high-quality demographic information from the panels of an audience measurement entity and/or registered user data of web service providers) results in improved reporting effectiveness of metrics for both online and offline advertising campaigns. Example techniques disclosed herein use online registration data to identify demographics of users, and/or other user information, and use server impression counts, and/or other techniques to track quantities of impressions attributable to those users.

Just as database proprietors may share demographic information that matches collected cookie information of unique individuals to enable an AME to assess the demographic composition of an audience, examples disclosed herein take advantage of information from database proprietors to estimate the frequency distribution of media impressions. A challenge with using the impression information provided by database proprietors is that the information is typically limited to summary or aggregated statistics of the total number of unique audience members and the total number of impressions experienced by the audience members. In some examples, the summary of the impression information may be broken down into different buckets or intervals of multiple impression frequencies. That is, in some examples, in addition to identifying the total number of impressions associated with a total number of unique individuals recognized by a database proprietor, the database proprietor may also provide the number of unique individuals (e.g., the unique audience size) associated with different ranges of impression frequencies for the media of interest. For example, a first bucket may correspond to impression frequencies ranging from 1-3, a second bucket may correspond to impression frequencies ranging from 4-6, a third bucket may correspond to impression frequencies ranging from 7-9, and a fourth bucket may correspond to impression frequencies of 10 or greater. In such an example, the database proprietor may provide the impression count for each designated bucket and the corresponding unique audience size associated with the corresponding bucket. In some examples, the database proprietor may provide such summary statistics broken down by different demographics. For instance, the database proprietor may provide separate impression counts and unique audience size values within each of the frequency buckets broken down by age, gender, race, income, home location, occupation, any other demographic characteristic, and/or combinations thereof.

While a database proprietor may be able to match the cookies associated with a significant portion of individuals exposed to media, there is likely to be at least some individuals for whom demographic information is unavailable to the database proprietor. Where the database proprietor cannot identify the person associated with a particular media impression as reported to an AME, the database proprietor likewise cannot specify the frequency of media impressions associated with the person. Thus, the summary statistics provided by a database provider, including any breakdown of the data by demographics within separate buckets of frequency impressions, is limited to user-identified impressions corresponding to user-identified individuals (e.g., individuals identifiable by a database proprietor) to the exclusion of unidentified impressions associated with individuals whom the database proprietor is unable to uniquely identify.

Examples disclosed herein use summary statistics provided by a database proprietor associated with recognized individuals to estimate the corresponding statistics for a total population of interest. That is, the unique audience sizes and impression counts aggregated into different buckets of impression frequencies associated with audience members identified by a database proprietor are used to calculate unique audience sizes and impression counts corresponding to the same buckets impression frequencies but that account for audience members included in census audience measurements that are not identifiable by the database proprietor. Examples disclosed herein also enable the breakdown of the census audience measurement by different demographics when a database proprietor provides a similar breakdown of the audience members identified by the database proprietor.

As used herein, the term "census" when used in the context of audience measurements refers to the audience measurements that account for all instances of media exposure by all individuals in the total population of a target market for the media being monitored. The term census may be contrasted with the term "user-identified" that, as used herein, refers to the media exposures that can be specifically matched to unique individuals identifiable by a database proprietor because such individuals are registered users of the services provided by the database proprietor.

FIG. 1A is an example communication flow diagram 100 of an example manner in which an audience measurement entity (AME) 102 can collect audience measurement data include impressions of media accessed on, and reported by, client devices 104. In some examples, the AME 102 includes an example audience measurement analyzer 200 to be implemented by a computer/processor system (e.g., the processor system 900 of FIG. 9) that may analyze the collected audience measurement data to determine unique audience sizes and impression counts for different frequency intervals. In some examples, the AME 102 communicates with a database proprietor 106 to collect demographic information associated with audience members exposed to media. In some examples, the database proprietor 106 may provide summary or aggregate statistics indicative of the unique audience sizes and associated impression counts for different frequency intervals associated with audience members identified by the database proprietor 106. In some examples, the summary statistics may be further broken down by different demographic characteristics.

Demographic impressions refer to impressions that can be associated with particular individuals for whom specific demographic information is known. The example chain of events shown in FIG. 1A occurs when a client device 104 accesses media 110 for which the client device 104 reports an impression to the AME 102 and/or the database proprietor 106. In some examples, the client device 104 reports impressions for accessed media based on instructions (e.g., beacon instructions) embedded in the media that instruct the client device 104 (e.g., instruct a web browser or an app in the client device 104) to send beacon/impression requests to the AME 102 and/or the database proprietor 106. In such examples, the media having the beacon instructions is referred to as tagged media. In other examples, the client device 104 reports impressions for accessed media based on instructions embedded in apps or web browsers that execute on the client device 104 to send beacon/impression requests to the AME 102 and/or the database proprietor 106 for corresponding media accessed via those apps or web browsers. In any case, the beacon/impression requests include device/user identifiers (IDs) (e.g., AME IDs and/or database proprietor IDs) to allow the corresponding AME 102 and/or the corresponding database proprietor 106 to associate demographic information with resulting logged impressions.

In the illustrated example, the client device 104 accesses media 110 that is tagged with the beacon instructions 112. The beacon instructions 112 cause the client device 104 to send a beacon/impression request 114 to an AME impressions collector 116 when the client device 104 accesses the media 110. For example, a web browser and/or app of the client device 104 executes the beacon instructions 112 in the media 110 which instruct the browser and/or app to generate and send the beacon/impression request 114. In the illustrated example, the client device 104 sends the beacon/impression request 114 using a network communication including an HTTP (hypertext transfer protocol) request addressed to the URL (uniform resource locator) of the AME impressions collector 116 at, for example, a first internet domain of the AME 102. The beacon/impression request 114 of the illustrated example includes a media identifier 118 (e.g., an identifier that can be used to identify content, an advertisement, and/or any other media) corresponding to the media 110. In some examples, the beacon/impression request 114 also includes a site identifier (e.g., a URL) of the website that served the media 110 to the client device 104 and/or a host website ID (e.g., www.acme.com) of the website that displays or presents the media 110. In the illustrated example, the beacon/impression request 114 includes a device/user identifier 120. In the illustrated example, the device/user identifier 120 that the client device 104 provides to the AME impressions collector 116 in the beacon impression request 114 is an AME ID because it corresponds to an identifier that the AME 102 uses to identify a panelist corresponding to the client device 104. In other examples, the client device 104 may not send the device/user identifier 120 until the client device 104 receives a request for the same from a server of the AME 102 in response to, for example, the AME impressions collector 116 receiving the beacon/impression request 114.

In some examples, the device/user identifier 120 may include a hardware identifier (e.g., an international mobile equipment identity (IMEI), a mobile equipment identifier (MEID), a media access control (MAC) address, etc.), an app store identifier (e.g., a Google Android ID, an Apple ID, an Amazon ID, etc.), a unique device identifier (UDID) (e.g., a non-proprietary UDID or a proprietary UDID such as used on the Microsoft Windows platform), an open source unique device identifier (OpenUDID), an open device identification number (ODIN), a login identifier (e.g., a username), an email address, user agent data (e.g., application type, operating system, software vendor, software revision, etc.), an Ad-ID (e.g., an advertising ID introduced by Apple, Inc. for uniquely identifying mobile devices for the purposes of serving advertising to such mobile devices), an Identifier for Advertisers (IDFA) (e.g., a unique ID for Apple iOS devices that mobile ad networks can use to serve advertisements), a Google Advertising ID, a Roku ID (e.g., an identifier for a Roku OTT device), a third-party service identifier (e.g., advertising service identifiers, device usage analytics service identifiers, demographics collection service identifiers), web storage data, document object model (DOM) storage data, local shared objects (also referred to as "Flash cookies"), and/or any other identifier that the AME 102 stores in association with demographic information about users of the client devices 104. In this manner, when the AME 102 receives the device/user identifier 120, the AME 102 can obtain demographic information corresponding to a user of the client device 104 based on the device/user identifier 120 that the AME 102 receives from the client device 104. In some examples, the device/user identifier 120 may be encrypted (e.g., hashed) at the client device 104 so that only an intended final recipient of the device/user identifier 120 can decrypt the hashed identifier 120. For example, if the device/user identifier 120 is a cookie that is set in the client device 104 by the AME 102, the device/user identifier 120 can be hashed so that only the AME 102 can decrypt the device/user identifier 120. If the device/user identifier 120 is an IMEI number, the client device 104 can hash the device/user identifier 120 so that only a wireless carrier (e.g., the database proprietor 106) can decrypt the hashed identifier 120 to recover the IMEI for use in accessing demographic information corresponding to the user of the client device 104. By hashing the device/user identifier 120, an intermediate party (e.g., an intermediate server or entity on the Internet) receiving the beacon request cannot directly identify a user of the client device 104.

In response to receiving the beacon/impression request 114, the AME impressions collector 116 logs an impression for the media 110 by storing the media identifier 118 contained in the beacon/impression request 114. In the illustrated example of FIG. 1A, the AME impressions collector 116 also uses the device/user identifier 120 in the beacon/impression request 114 to identify AME panelist demographic information corresponding to a panelist of the client device 104. That is, the device/user identifier 120 matches a user ID of a panelist member (e.g., a panelist corresponding to a panelist profile maintained and/or stored by the AME 102). In this manner, the AME impressions collector 116 can associate the logged impression with demographic information of a panelist corresponding to the client device 104.

In some examples, the beacon/impression request 114 may not include the device/user identifier 120 if, for example, the user of the client device 104 is not an AME panelist. In such examples, the AME impressions collector 116 logs impressions regardless of whether the client device 104 provides the device/user identifier 120 in the beacon/impression request 114 (or in response to a request for the identifier 120). When the client device 104 does not provide the device/user identifier 120, the AME impressions collector 116 will still benefit from logging an impression for the media 110 even though it will not have corresponding demographics (e.g., an impression may be collected as a census impression). For example, the AME 102 may still use the logged impression to generate a total impressions count and/or a frequency of impressions (e.g., an impressions frequency) for the media 110. Additionally or alternatively, the AME 102 may obtain demographics information from the database proprietor 106 for the logged impression if the client device 104 corresponds to a subscriber of the database proprietor 106.

In the illustrated example of FIG. 1A, to compare or supplement panelist demographics (e.g., for accuracy or completeness) of the AME 102 with demographics from one or more database proprietors (e.g., the database proprietor 106), the AME impressions collector 116 returns a beacon response message 122 (e.g., a first beacon response) to the client device 104 including an HTTP "302 Found" re-direct message and a URL of a participating database proprietor 106 at, for example, a second internet domain. In the illustrated example, the HTTP "302 Found" re-direct message in the beacon response 122 instructs the client device 104 to send a second beacon request 124 to the database proprietor 106. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 124) to a participating database proprietor 106. In the illustrated example, the AME impressions collector 116 determines the database proprietor 106 specified in the beacon response 122 using a rule and/or any other suitable type of selection criteria or process. In some examples, the AME impressions collector 116 determines a particular database proprietor to which to redirect a beacon request based on, for example, empirical data indicative of which database proprietor is most likely to have demographic data for a user corresponding to the device/user identifier 120. In some examples, the beacon instructions 112 include a predefined URL of one or more database proprietors to which the client device 104 should send follow up beacon requests 124. In other examples, the same database proprietor is always identified in the first redirect message (e.g., the beacon response 122).

In the illustrated example of FIG. 1A, the beacon/impression request 124 may include a device/user identifier 126 that is a database proprietor ID because it is used by the database proprietor 106 to identify a subscriber of the client device 104 when logging an impression. In some instances (e.g., in which the database proprietor 106 has not yet set a database proprietor ID in the client device 104), the beacon/impression request 124 does not include the device/user identifier 126. In some examples, the database proprietor ID is not sent until the database proprietor 106 requests the same (e.g., in response to the beacon/impression request 124). In some examples, the device/user identifier 126 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 106 stores in association with demographic information about subscribers corresponding to the client devices 104. When the database proprietor 106 receives the device/user identifier 126, the database proprietor 106 can obtain demographic information corresponding to a user of the client device 104 based on the device/user identifier 126 that the database proprietor 106 receives from the client device 104. In some examples, the device/user identifier 126 may be encrypted (e.g., hashed) at the client device 104 so that only an intended final recipient of the device/user identifier 126 can decrypt the hashed identifier 126. For example, if the device/user identifier 126 is a cookie that is set in the client device 104 by the database proprietor 106, the device/user identifier 126 can be hashed so that only the database proprietor 106 can decrypt the device/user identifier 126. If the device/user identifier 126 is an IMEI number, the client device 104 can hash the device/user identifier 126 so that only a wireless carrier (e.g., the database proprietor 106) can decrypt the hashed identifier 126 to recover the IMEI for use in accessing demographic information corresponding to the user of the client device 104. By hashing the device/user identifier 126, an intermediate party (e.g., an intermediate server or entity on the Internet) receiving the beacon request cannot directly identify a user of the client device 104. For example, if the intended final recipient of the device/user identifier 126 is the database proprietor 106, the AME 102 cannot recover identifier information when the device/user identifier 126 is hashed by the client device 104 for decrypting only by the intended database proprietor 106.

Although only a single database proprietor 106 is shown in FIG. 1A, the impression reporting/collection process of FIG. 1A may be implemented using multiple database proprietors. In some such examples, the beacon instructions 112 cause the client device 104 to send beacon/impression requests 124 to numerous database proprietors. For example, the beacon instructions 112 may cause the client device 104 to send the beacon/impression requests 124 to the numerous database proprietors in parallel or in daisy chain fashion. In some such examples, the beacon instructions 112 cause the client device 104 to stop sending beacon/impression requests 124 to database proprietors once a database proprietor has recognized the client device 104. In other examples, the beacon instructions 112 cause the client device 104 to send beacon/impression requests 124 to database proprietors so that multiple database proprietors can recognize the client device 104 and log a corresponding impression. In any case, multiple database proprietors are provided the opportunity to log impressions and provide corresponding demographics information if the user of the client device 104 is a subscriber of services of those database proprietors.

In some examples, prior to sending the beacon response 122 to the client device 104, the AME impressions collector 116 replaces site IDs (e.g., URLs) of media provider(s) that served the media 110 with modified site IDs (e.g., substitute site IDs) which are discernable only by the AME 102 to identify the media provider(s). In some examples, the AME impressions collector 116 may also replace a host website ID (e.g., www.acme.com) with a modified host site ID (e.g., a substitute host site ID) which is discernable only by the AME 102 as corresponding to the host website via which the media 110 is presented. In some examples, the AME impressions collector 116 also replaces the media identifier 118 with a modified media identifier 118 corresponding to the media 110. In this way, the media provider of the media 110, the host website that presents the media 110, and/or the media identifier 118 are obscured from the database proprietor 106, but the database proprietor 106 can still log impressions based on the modified values which can later be deciphered by the AME 102 after the AME 102 receives logged impressions from the database proprietor 106. In some examples, the AME impressions collector 116 does not send site IDs, host site IDS, the media identifier 118 or modified versions thereof in the beacon response 122. In such examples, the client device 104 provides the original, non-modified versions of the media identifier 118, site IDs, host IDs, etc. to the database proprietor 106.

In the illustrated example, the AME impression collector 116 maintains a modified ID mapping table 128 that maps original site IDs with modified (or substitute) site IDs, original host site IDs with modified host site IDs, and/or maps modified media identifiers to the media identifiers such as the media identifier 118 to obfuscate or hide such information from database proprietors such as the database proprietor 106. Also in the illustrated example, the AME impressions collector 116 encrypts all of the information received in the beacon/impression request 114 and the modified information to prevent any intercepting parties from decoding the information. The AME impressions collector 116 of the illustrated example sends the encrypted information in the beacon response 122 to the client device 104 so that the client device 104 can send the encrypted information to the database proprietor 106 in the beacon/impression request 124. In the illustrated example, the AME impressions collector 116 uses an encryption that can be decrypted by the database proprietor 106 site specified in the HTTP "302 Found" re-direct message.

Periodically or aperiodically, the audience measurement data collected by the database proprietor 106 is provided to a database proprietor impressions collector 130 of the AME 102 as, for example, batch data. In some examples, the audience measurement data may be combined or aggregated to generate a media impression frequency distribution for individuals exposed to the media 110 that the database proprietor 106 was able to identify (e.g., based on the device/user identifier 126). During a data collecting and merging process to combine demographic and audience measurement data from the AME 102 and the database proprietor(s) 106, impressions logged by the AME 102 for the client devices 104 that do not have a database proprietor ID will not correspond to impressions logged by the database proprietor 106 because the database proprietor 106 typically does not log impressions for the client devices that do not have database proprietor IDs.

Additional examples that may be used to implement the beacon instruction processes of FIG. 1A are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, referred to above.

Figure 1B:
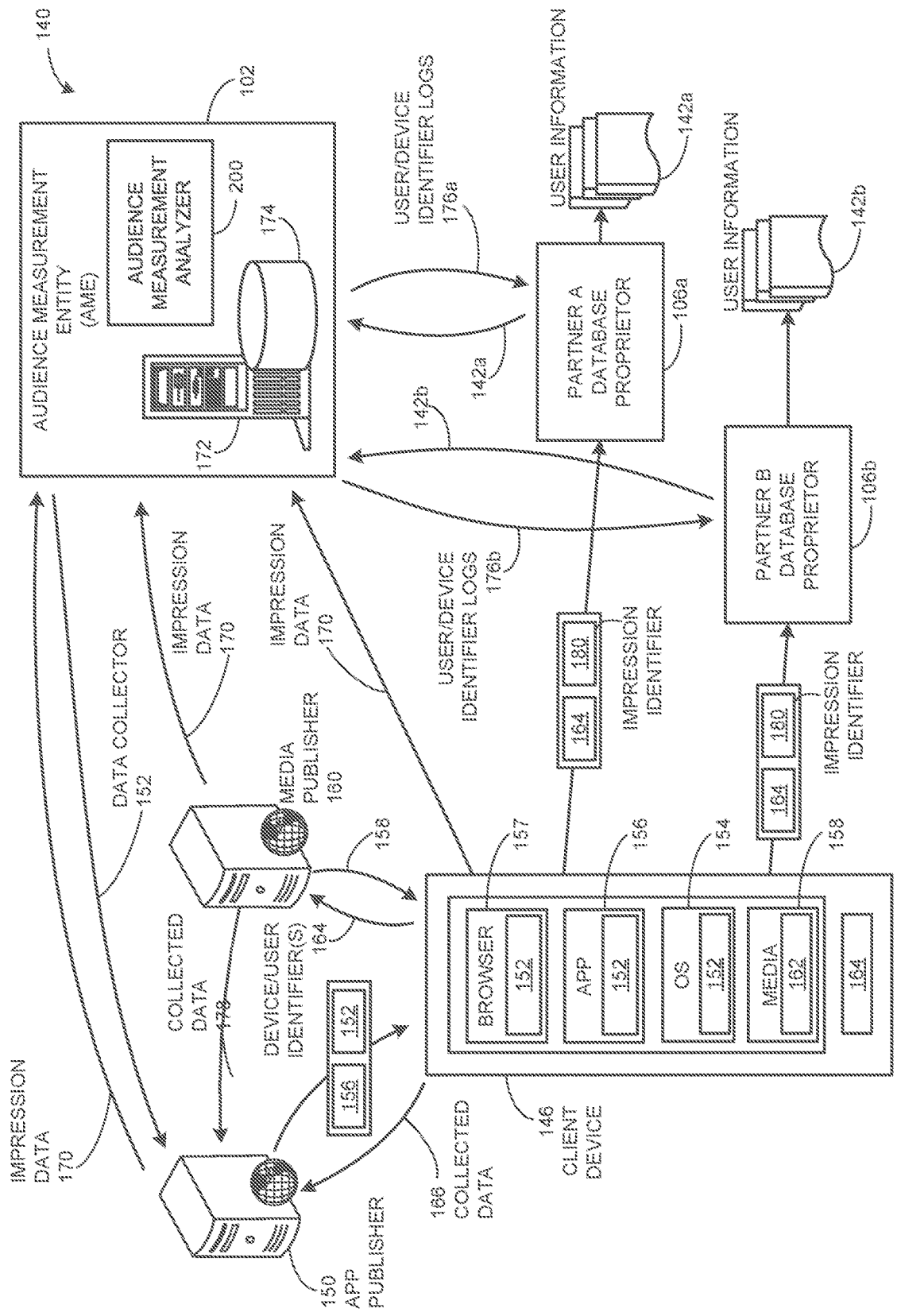
FIG. 1B depicts an example system to collect impressions of media presented on mobile devices and to collect impression information from distributed database proprietors for associating with the collected impressions.

FIG. 1B depicts an example system 142 to collect impression information based on user information 142*a*, 142*b* from distributed database proprietors 106 (designated as 106*a* and 106*b* in FIG. 1B) for associating with impressions of media presented at a client device 146. In the illustrated examples, user information 142*a*, 142*b* or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Thus, the user information 142a, 142b may indicate and/or be analyzed to determine the impression frequency of individual users with respect to different media accessed by the users. In some examples, such impression information, may be combined or aggregated to generate a media impression frequency distribution for all users exposed to particular media for whom the database proprietor has particular user information 142a, 142b. More particularly, in the illustrated example of FIG. 1B, the AME 102 includes the example audience measurement analyzer 200 to analyze the collected audience measurement data to determine frequency distributions for media impressions as described more fully below.

In the illustrated example of FIG. 1B, the client device 146 may be a mobile device (e.g., a smart phone, a tablet, etc.), an internet appliance, a smart television, an internet terminal, a computer, or any other device capable of presenting media received via network communications. In some examples, to track media impressions on the client device 146, an audience measurement entity (AME) 102 partners with or cooperates with an app publisher 150 to download and install a data collector 152 on the client device 146. The app publisher 150 of the illustrated example may be a software app developer that develops and distributes apps to mobile devices and/or a distributor that receives apps from software app developers and distributes the apps to mobile devices. The data collector 152 may be included in other software loaded onto the client device 146, such as the operating system 154, an application (or app) 156, a web browser 117, and/or any other software.

Any of the example software 154, 156, 117 may present media 158 received from a media publisher 160. The media 158 may be an advertisement, video, audio, text, a graphic, a web page, news, educational media, entertainment media, or any other type of media. In the illustrated example, a media ID 162 is provided in the media 158 to enable identifying the media 158 so that the AME 102 can credit the media 158 with media impressions when the media 158 is presented on the client device 146 or any other device that is monitored by the AME 102.

The data collector 152 of the illustrated example includes instructions (e.g., Java, java script, or any other computer language or script) that, when executed by the client device 146, cause the client device 146 to collect the media ID 162 of the media 158 presented by the app program 156, the browser 117, and/or the client device 146, and to collect one or more device/user identifier(s) 164 stored in the client device 146. The device/user identifier(s) 164 of the illustrated example include identifiers that can be used by corresponding ones of the partner database proprietors 106a-b to identify the user or users of the client device 146, and to locate user information 142a-b corresponding to the user(s). For example, the device/user identifier(s) 164 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), a unique device identifier (UDID) (e.g., a non-proprietary UDID or a proprietary UDID such as used on the Microsoft Windows platform), an open source unique device identifier (OpenUDID), an open device identification number (ODIN), a login identifier (e.g., a username), an email address, user agent data (e.g., application type, operating system, software vendor, software revision, etc.), an Ad-ID (e.g., an advertising ID introduced by Apple, Inc. for uniquely identifying mobile devices for the purposes of serving advertising to such mobile devices), an Identifier for Advertisers (IDFA) (e.g., a unique ID for Apple iOS devices that mobile ad networks can use to serve advertisements), a Google Advertising ID, a Roku ID (e.g., an identifier for a Roku OTT device), third-party service identifiers (e.g., advertising service identifiers, device usage analytics service identifiers, demographics collection service identifiers), web storage data, document object model (DOM) storage data, local shared objects (also referred to as "Flash cookies"), etc. In examples in which the media 158 is accessed using an application and/or browser (e.g., the app 156 and/or the browser 117) that do not employ cookies, the device/user identifier(s) 164 are non-cookie identifiers such as the example identifiers noted above. In examples in which the media 158 is accessed using an application or browser that does employ cookies, the device/user identifier(s) 164 may additionally or alternatively include cookies. In some examples, fewer or more device/user identifier(s) 164 may be used. In addition, although only two partner database proprietors 106a-b are shown in FIG. 1, the AME 102 may partner with any number of partner database proprietors to collect distributed user information (e.g., the user information 142a-b).

In some examples, the client device 146 may not allow access to identification information stored in the client device 146. For such instances, the disclosed examples enable the AME 102 to store an AME-provided identifier (e.g., an identifier managed and tracked by the AME 102) in the client device 146 to track media impressions on the client device 146. For example, the AME 102 may provide instructions in the data collector 152 to set an AME-provided identifier in memory space accessible by and/or allocated to the app program 156 and/or the browser 117, and the data collector 152 uses the identifier as a device/user identifier 164. In such examples, the AME-provided identifier set by the data collector 152 persists in the memory space even when the app program 156 and the data collector 152 and/or the browser 117 and the data collector 152 are not running. In this manner, the same AME-provided identifier can remain associated with the client device 146 for extended durations. In some examples in which the data collector 152 sets an identifier in the client device 146, the AME 102 may recruit a user of the client device 146 as a panelist, and may store user information collected from the user during a panelist registration process and/or collected by monitoring user activities/behavior via the client device 146 and/or any other device used by the user and monitored by the AME 102. In this manner, the AME 102 can associate user information of the user (from panelist data stored by the AME 102) with media impressions attributed to the user on the client device 146. As used herein, a panelist is a user registered on a panel maintained by a ratings entity (e.g., the AME 102) that monitors and estimates audience exposure to media.

In the illustrated example, the data collector 152 sends the media ID 162 and the one or more device/user identifier(s) 164 as collected data 166 to the app publisher 150. Alternatively, the data collector 152 may be configured to send the collected data 166 to another collection entity (other than the app publisher 150) that has been contracted by the AME 102 or is partnered with the AME 102 to collect media ID's (e.g., the media ID 162) and device/user identifiers (e.g., the device/user identifier(s) 164) from user devices (e.g., the client device 146). In the illustrated example, the app publisher 150 (or a collection entity) sends the media ID 162 and the device/user identifier(s) 164 as impression data 170 to an impression collector 172 (e.g., an impression collection server or a data collection server) at the AME 102. The impression data 170 of the illustrated example may include one media ID 162 and one or more device/user identifier(s) 164 to report a single impression of the media 158, or it may include numerous media ID's 162 and device/user identifier(s) 164 based on numerous instances of collected data (e.g., the collected data 166) received from the client device 146 and/or other devices to report multiple impressions of media.

In the illustrated example, the impression collector 172 stores the impression data 170 in an AME media impressions store 174 (e.g., a database or other data structure). Subsequently, the AME 102 sends the device/user identifier(s) 164 to corresponding partner database proprietors (e.g., the partner database proprietors 106a-b) to receive user information (e.g., the user information 142a-b) corresponding to the device/user identifier(s) 164 from the partner database proprietors 106a-b so that the AME 102 can associate the user information with corresponding media impressions of media (e.g., the media 158) presented at the client device 146.

More particularly, in some examples, after the AME 102 receives the device/user identifier(s) 164, the AME 102 sends device/user identifier logs 176a-b to corresponding partner database proprietors (e.g., the partner database proprietors 106a-b). Each of the device/user identifier logs 176a-b may include a single device/user identifier 164, or it may include numerous aggregate device/user identifiers 164 received over time from one or more devices (e.g., the client device 146). After receiving the device/user identifier logs 176a-b, each of the partner database proprietors 106a-b looks up its users corresponding to the device/user identifiers 164 in the respective logs 176a-b. In this manner, each of the partner database proprietors 106a-b collects user information 142a-b corresponding to users identified in the device/user identifier logs 176a-b for sending to the AME 102. For example, if the partner database proprietor 106a is a wireless service provider and the device/user identifier log 176a includes IMEI numbers recognizable by the wireless service provider, the wireless service provider accesses its subscriber records to find users having IMEI numbers matching the IMEI numbers received in the device/user identifier log 176a. When the users are identified, the wireless service provider copies the users' user information to the user information 142a for delivery to the AME 102.

In some other examples, the data collector 152 is configured to collect the device/user identifier(s) 164 from the client device 146. The example data collector 152 sends the device/user identifier(s) 164 to the app publisher 150 in the collected data 166, and it also sends the device/user identifier(s) 164 to the media publisher 160. In such other examples, the data collector 152 does not collect the media ID 162 from the media 158 at the client device 146 as the data collector 152 does in the example system 142 of FIG. 1B. Instead, the media publisher 160 that publishes the media 158 to the client device 146 retrieves the media ID 162 from the media 158 that it publishes. The media publisher 160 then associates the media ID 162 to the device/user identifier(s) 164 received from the data collector 152 executing in the client device 146, and sends collected data 178 to the app publisher 150 that includes the media ID 162 and the associated device/user identifier(s) 164 of the client device 146. For example, when the media publisher 160 sends the media 158 to the client device 146, it does so by identifying the client device 146 as a destination device for the media 158 using one or more of the device/user identifier(s) 164 received from the client device 146. In this manner, the media publisher 160 can associate the media ID 162 of the media 158 with the device/user identifier(s) 164 of the client device 146 indicating that the media 158 was sent to the particular client device 146 for presentation (e.g., to generate an impression of the media 158).

In some other examples in which the data collector 152 is configured to send the device/user identifier(s) 164 to the media publisher 160, the data collector 152 does not collect the media ID 162 from the media 158 at the client device 146. Instead, the media publisher 160 that publishes the media 158 to the client device 146 also retrieves the media ID 162 from the media 158 that it publishes. The media publisher 160 then associates the media ID 162 with the device/user identifier(s) 164 of the client device 146. The media publisher 160 then sends the media impression data 170, including the media ID 162 and the device/user identifier(s) 164, to the AME 102. For example, when the media publisher 160 sends the media 158 to the client device 146, it does so by identifying the client device 146 as a destination device for the media 158 using one or more of the device/user identifier(s) 164. In this manner, the media publisher 160 can associate the media ID 162 of the media 158 with the device/user identifier(s) 164 of the client device 146 indicating that the media 158 was sent to the particular client device 146 for presentation (e.g., to generate an impression of the media 158). In the illustrated example, after the AME 102 receives the impression data 170 from the media publisher 160, the AME 102 can then send the device/user identifier logs 176a-b to the partner database proprietors 106a-b to request the user information 142a-b as described above.

Although the media publisher 160 is shown separate from the app publisher 150 in FIG. 1, the app publisher 150 may implement at least some of the operations of the media publisher 160 to send the media 158 to the client device 146 for presentation. For example, advertisement providers, media providers, or other information providers may send media (e.g., the media 158) to the app publisher 150 for publishing to the client device 146 via, for example, the app program 156 when it is executing on the client device 146. In such examples, the app publisher 150 implements the operations described above as being performed by the media publisher 160.

Additionally or alternatively, in contrast with the examples described above in which the client device 146 sends identifiers to the audience measurement entity 102 (e.g., via the application publisher 150, the media publisher 160, and/or another entity), in other examples the client device 146 (e.g., the data collector 152 installed on the client device 146) sends the identifiers (e.g., the device/user identifier(s) 164) directly to the respective database proprietors 106a, 106b (e.g., not via the AME 102). In such examples, the example client device 146 sends the media identifier 162 to the audience measurement entity 102 (e.g., directly or through an intermediary such as via the application publisher 150), but does not send the media identifier 162 to the database proprietors 106a-b.

As mentioned above, the example partner database proprietors 106a-b provide the user information 142a-b to the example AME 102 for matching with the media identifier 162 to form media impression information. As also mentioned above, the database proprietors 106a-b are not provided copies of the media identifier 162. Instead, the client provides the database proprietors 106a-b with impression identifiers 180. An impression identifier uniquely identifies an impression event relative to other impression events of the client device 146 so that an occurrence of an impression at the client device 146 can be distinguished from other occurrences of impressions. However, the impression identifier 180 does not itself identify the media associated with that impression event. In such examples, the impression data 170 from the client device 146 to the AME 102 also includes the impression identifier 180 and the corresponding media identifier 162. To match the user information 142*a-b* with the media identifier 162, the example partner database proprietors 106*a-b* provide the user information 142*a-b* to the AME 102 in association with the impression identifier 180 for the impression event that triggered the collection of the user information 142*a-b*. In this manner, the AME 102 can match the impression identifier 180 received from the client device 146 to a corresponding impression identifier 180 received from the partner database proprietors 106*a-b* to associate the media identifier 162 received from the client device 146 with demographic information in the user information 142*a-b* received from the database proprietors 106*a-b*. The impression identifier 180 can additionally be used for reducing or avoiding duplication of demographic information. For example, the example partner database proprietors 106*a-b* may provide the user information 142*a-b* and the impression identifier 180 to the AME 102 on a per-impression basis (e.g., each time a client device 146 sends a request including an encrypted identifier 164*a-b* and an impression identifier 180 to the partner database proprietor 106*a-b*) and/or on an aggregated basis (e.g., send a set of user information 142*a-b*, which may include indications of multiple impressions (e.g., multiple impression identifiers 180), to the AME 102 presented at the client device 146).

The impression identifier 180 provided to the AME 102 enables the AME 102 to distinguish unique impressions and avoid over counting a number of unique users and/or devices viewing the media. For example, the relationship between the user information 142*a* from the partner A database proprietor 106*a* and the user information 142*b* from the partner B database proprietor 106*b* for the client device 146 is not readily apparent to the AME 102. By including an impression identifier 180 (or any similar identifier), the example AME 102 can associate user information corresponding to the same user between the user information 142*a-b* based on matching impression identifiers 180 stored in both of the user information 142*a-b*. The example AME 102 can use such matching impression identifiers 180 across the user information 142*a-b* to avoid over counting mobile devices and/or users (e.g., by only counting unique users instead of counting the same user multiple times).

A same user may be counted multiple times if, for example, an impression causes the client device 146 to send multiple device/user identifiers to multiple different database proprietors 106*a-b* without an impression identifier (e.g., the impression identifier 180). For example, a first one of the database proprietors 106*a* sends first user information 142*a* to the AME 102, which signals that an impression occurred. In addition, a second one of the database proprietors 106*b* sends second user information 142*b* to the AME 102, which signals (separately) that an impression occurred. In addition, separately, the client device 146 sends an indication of an impression to the AME 102. Without knowing that the user information 142*a-b* is from the same impression, the AME 102 has an indication from the client device 146 of a single impression and indications from the database proprietors 106*a-b* of multiple impressions.

To avoid over counting impressions, the AME 102 can use the impression identifier 180. For example, after looking up user information 142*a-b*, the example partner database proprietors 106*a-b* transmit the impression identifier 180 to the AME 102 with corresponding user information 142*a-b*. The AME 102 matches the impression identifier 180 obtained directly from the client device 146 to the impression identifier 180 received from the database proprietors 106*a-b* with the user information 142*a-b* to thereby associate the user information 142*a-b* with the media identifier 162 and to generate impression information. This is possible because the AME 102 received the media identifier 162 in association with the impression identifier 180 directly from the client device 146. Therefore, the AME 102 can map user data from two or more database proprietors 106*a-b* to the same media exposure event, thus avoiding double counting.

Figure 2:
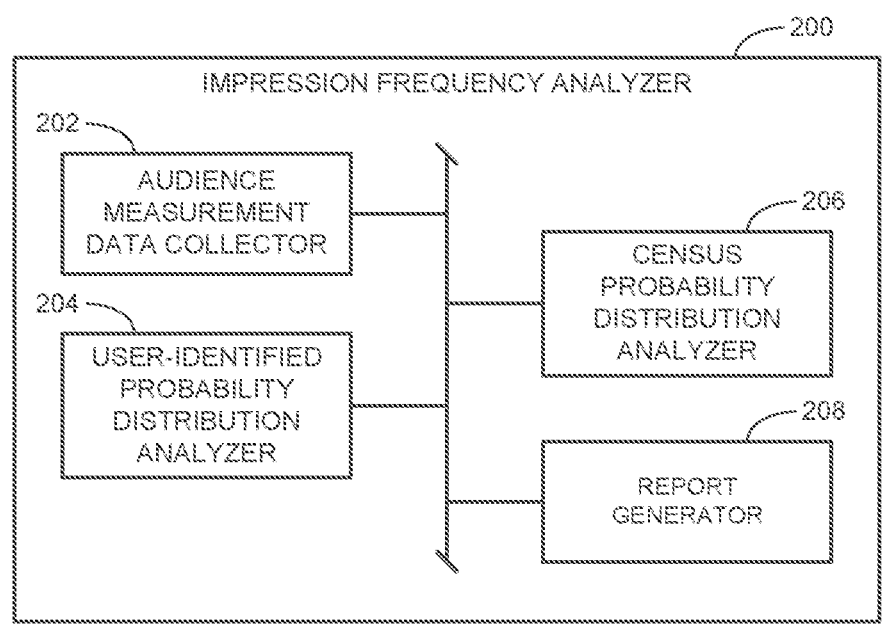
FIG. 2 is a block diagram illustrating an example implementation of the audience measurement analyzer of FIGS. 1A and/or 1B.

FIG. 2 is a block diagram illustrating an example implementation of the example audience measurement analyzer 200 of FIGS. 1A and 1B to determine frequency distributions for media impressions. The example audience measurement analyzer 200 includes an example audience measurement data collector 202, an example user-identified probability distribution analyzer 204, an example census probability distribution analyzer 206, and an example report generator 208.

The example audience measurement data collector 202 of FIG. 2 collects user-identified audience measurement data from the database proprietor 106. In the illustrated example, the audience measurement data collector 202 receives the user-identified audience measurement data in an aggregated or summary form. That is, the user-identified audience measurement data expresses media access measures in groups associated with impression frequencies, demographics, and/or some other categorical division rather than providing data associated with individual users. In some instances, database proprietors (e.g., the database proprietor 106) share such aggregate-level data with other parties to prevent exposing specific internet activities, demographics, preferences, and/or other personal identifying information (PII) in a manner that such information could be attributable by the other parties to a specific user. The term "user identified" is used herein to correspond to individuals (or data associated with individuals) who are identifiable by the database proprietor 106 because, for example, they are users registered with the database proprietor 106.

Example user-identified audience measurement data obtained from the database proprietor 106 includes impression data and audience size data grouped into separate buckets or intervals of different impression frequencies referred to herein as frequency intervals. The audience size data for each frequency interval includes an indication of the number of unique individuals associated with an impression frequency for media of interest that falls within the corresponding frequency interval (e.g., the unique audience size corresponding to the frequency interval). The impression data for each frequency interval includes an indication of the total number of impressions the unique individuals had of the media of interest (e.g., the impression count corresponding to the frequency interval).

FIG. 3 illustrates example user-identified audience measurement data 300 that may be collected by the audience measurement data collector 202 of FIG. 2 from the database proprietor 106 of FIGS. 1A and/or 1B. As shown in the illustrated example, the data 300 is aggregated or grouped into three separate frequency intervals 302, 304, 306. The first frequency interval 302 is defined inclusively by a lower bound (LB) of 1 and an upper bound (UB) of 9. The second frequency interval 304 is defined inclusively by a lower bound (LB) of 10 and an upper bound (UB) of 24. The third frequency interval 306 is defined inclusively by a lower bound (LB) of 25 and an upper bound (UB) that goes to infinity. Examples disclosed herein are not limited by the number of intervals or how the boundaries of each interval are defined other than that the frequency intervals are assumed to be mutually exclusive (e.g., there is no overlap between intervals) and that all possible frequencies are assumed to be included in one of the designated intervals (e.g., the first interval begins with a frequency of 1 and the intervals are contiguous to an upper limit that may be a finite number or extend to infinity).

In addition to being divided into separate frequency intervals, the user-identified audience measurement data 300 shown in FIG. 3 is divided or grouped according to two different demographics 308, 310 (demographic 1 and demographic 2). The demographics 308, 310 may correspond to any suitable demographic characteristic(s) of the audience members represented by the data (e.g., age, gender, race, income, home location, occupation, etc.). As a specific example, the first demographic 308 may correspond to males that are between 25 and 29 years old while the second demographic 310 may correspond to females that are between 50 and 59 years old. Furthermore, the user-identified audience measurement data 300 may be divided into any number of demographic. Thus, although two demographics 308, 310 are shown in the illustrated example, in other examples, there may be more than two demographics. In some examples, the user-identified audience measurement data 300 may not be divided according to demographics. Rather, in such examples, all audience member data is aggregated into a single group and divided only based on the impression frequency (e.g., into the separate frequency intervals 302, 304, 306). Such examples may alternatively be described as a single demographic scenario.

Regardless of the division based on demographics, for each demographic, the user-identified audience measurement data 300 includes impression data and audience size data associated with each demographic identified. Thus, in the illustrated example, the data associated with the first demographic 308 includes first impression data 312 (indicating the total number of media impressions (e.g., an impression count) associated with each of the three frequency intervals 302, 304, 306) and first audience size data 314 (indicating of the total number of unique audience members to which the corresponding media impressions are attributed). Likewise, the data associated with the second demographic 310 includes second impression frequency 316 and second audience size data 318. In some examples, the user-identified audience measurement data 300 provided by the database proprietor 106 includes totals 320 of the impression data 312, 316 and the audience size data 314, 318 associated with each demographic 308, 310. In other examples, the totals 320 may be calculated by the AME 102 by summing the separate columns shown in FIG. 3.

In some examples, the user-identified audience measurement data 300 received by the audience measurement analyzer 200 includes additional information not shown in FIG. 3. For example, the user-identified audience measurement data 300 may include additional information to identify the particular media represented by the data (e.g., the media identifier 162 of FIG. 1B). Additionally, the user-identified audience measurement data 300 may further include information to identify the circumstances of the distribution of the media (e.g., the Internet site through which the media was accessed, the placement of the media within this Internet site, the geographic region (e.g., city, designated market area, etc.) where the media was accessed, etc.).

Although examples disclosed herein are described in connection with aggregate-level user-identified audience measurement data, the examples are not limited for use with situations in which the data is aggregated by database proprietors. Instead, examples disclosed herein may additionally or alternatively be used in instances in which database proprietors provide user-level data to an intermediary party and/or directly to the AME 102. In some examples, the intermediary party and/or the AME 102 generates aggregate level audience measurement data.

FIG. 4 illustrates example census audience measurement data 400 that may be collected by the audience measurement data collector 202 of FIG. 2. The census audience measurement data 400 of FIG. 4 corresponds to a population of individuals in the relevant market where the media of interest was distributed, regardless of whether the database proprietor 106 could uniquely identify such individuals. Thus, as used herein, census audience measurement data refers to information relating to all impressions and corresponding audience members associated with media being monitored regardless of whether the database proprietor 106 was able to identify the audience members to match the impressions to particular individuals. Impressions for which no person could be recognized by the database proprietor 106 are referred to herein as unidentified impressions. In some examples, the census audience measurement data includes aggregate totals of both user-identified impressions and unidentified impressions, collectively referred to herein as volume or census impressions. While the census audience measurement data may be obtained from the database proprietor 106, the audience measurement data collector 202 may collect the census data from other sources such as, for example, directly from the client devices 146, via the app publisher 150, and/or the media publisher 160.

As shown in the illustrated example, the census audience measurement data 400 includes a total universe estimate 402, first demographic universe estimate 404, a second demographic universe estimate 406, and a total number of census impressions 408. The total universe estimate 402 corresponds to the total sum of all demographic universe estimates. In some examples, the total universe estimate 402 is associated with a population (e.g., the total number of people) within the region targeted for the media. For example, if the media is distributed nationwide, the total universe estimate 402 would be associated with the population size of the entire country. However, in some examples, the total universe estimate 402 may be less than the total population in the relevant region to include only those individuals that have access to the domain under study to be reached by the relevant media. For example, if the domain through which the media of interest is accessed, the universe estimate would include individuals that have access to the internet but exclude those that do not have access to internet. Any other factor or combination of factors (e.g., access to the Internet, accesses the Internet on tablet only, lives in a particular state, etc.) may define who within a particular population is included in the total universe estimate 402. In some examples, the precise number of people that satisfy the criteria of the total universe estimate 402 may not be known. Accordingly, in some examples, the total universe estimate 402 is an estimate based on available information. In some examples, the total universe estimate 402 is estimated directly by the AME 102 rather than being provided in the user-identified audience measurement data 300 received from the database proprietor 106.

The first and second demographic universe estimates 404, 406 correspond to the total number of individuals within the total universe estimate 402 associated with the first and second demographics 308, 310 into which the user-identified audience measurement data 300 was broken up as described above in connection with FIG. 3. As with the total universe estimate 402, in some examples, the first and second demographic universe estimates 404, 406 are estimated based on available information. Further, in some examples, the first and second demographic universe estimates 404, 406 are estimated directly by the AME 102 rather than being included in the census audience measurement data 400 received by the audience measurement data collector 202.

The total number of census impressions 408 of FIG. 4 corresponds to the total number of impressions recorded for the particular media item associated with the census audience measurement data 400. In some examples, the audience measurement analyzer 200 has access to this number independent of the database proprietor 106 based on the impression data 170 collected from the app publisher 150 and/or the media publisher 160 as described above in connection with FIG. 1B.

As apparent from a comparison of FIGS. 3 and 4, the user-identified audience measurement data 300 includes significantly more detail than the census audience measurement data 400. In particular, the user-identified audience measurement data 300 identifies the unique audience size associated with media impressions. Furthermore, the user-identified audience measurement data 300 includes a breakdown of the unique audience size and the associated media impressions across different demographics 308, 310 and grouped into multiple different frequency intervals 302, 304, 306. While this additional information is beneficial, the user-identified audience measurement data 300 is limited in that it does not account for all impressions associated with the media of interest. In particular, summing the total impressions associated with each demographic 308, 310 of FIG. 3 results in 12,702+23,603=36,305 impressions, which is nearly 9,000 less than the 45,000 census impressions 408 recorded in the census audience measurement data 400 of FIG. 4. Thus, while the user-identified audience measurement data 300 is more detailed than the census audience measurement data 400, the census audience measurement data 400 corresponds to a much larger pool of impressions. Examples disclosed herein use the user-identified audience measurement data 300 in combination with the census audience measurement data 400 to statistically determine the distribution of impressions and associated audience members across the same demographics 308, 310 as shown in FIG. 3 and grouped according to the same frequency intervals 302, 304, 306. That is, examples, disclosed herein enable the population of a table similar to that shown in FIG. 3 but based on census data rather than being limited to user-identified data.

More particularly, examples disclosed herein generate detailed census-level impression and audience size information based on principles of maximum entropy and minimum cross entropy from information theory. More particularly, returning to FIG. 2, the example audience measurement analyzer 200 includes the user-identified probability distribution analyzer 204 to determine a user-identified probability distribution of impression frequencies that satisfies the principle of maximum entropy subject to constraints defined by the user-identified audience measurement data 300 for each demographic 308, 310. As used herein, a user-identified probability distribution (identified by the symbol Q) defines the probabilities ($q_i$) of different impression frequencies associated with a given person in a population of interest who is matched to identifiable individuals by the database proprietor 106. That is, the user-identified probability distribution Q models the user-identified audience measurement data 300 shown in FIG. 3. In some examples, the user-identified probability distribution analyzer 204 determines separate user-identified probability distributions corresponding to the separate demographics 308, 310 across which the user-identified audience measurement data 300 is divided.

The maximum entropy analysis performed by the user-identified probability distribution analyzer 204 may be expressed mathematically as solving the following equation:

$$\underset{Q^{(k)}}{\text{maximize}} \ H^{(k)} = -\sum_{i=0}^{I} q_i^{(k)} \log(q_i^{(k)}) \tag{1a}$$

subject to the following constraints:

$$\sum_{i=0}^{I} q_i^{(k)} = 1 \tag{1b}$$

$$\sum_{i=LB_j}^{UB_j} q_i^{(k)} = \frac{A_j^{(k)}}{U^{(k)}} \ \forall j = \{1, 2, \ldots, J\} \tag{1c}$$

$$\sum_{i=LB_j}^{UB_j} i q_i^{(k)} = \frac{R_j^{(k)}}{U^{(k)}} \ \forall j = \{1, 2, \ldots, J\} \tag{1d}$$

where $A_j^{(k)}$ and $R_j^{(k)}$ correspond, respectively, to the unique audience size and the impression count associated with the jth frequency interval within the kth demographic as reported in the user-identified audience measurement data obtained from the database proprietor 106. That is, with reference to the example data 300 shown in FIG. 3, $A_3^{(2)}$ is 335 as shown with reference to the second audience data 318 of the second demographic 310 (e.g., k=2) associated with the third frequency interval 306 (e.g., j=3). Similarly, $R_2^{(1)}$ is 3,560 as shown with reference to the first impression data 312 of the first demographic 308 (e.g., k=1) associated with the second frequency interval 304 (e.g., j=2). Furthermore, $U^{(k)}$ represents the universe estimate specific to the kth demographic (e.g., the first or second universe estimates 404, 406 of FIG. 4). Further, i is the index for the different probabilities $q_i$ within the user-identified probability distribution Q and corresponds to the impression frequency associated with the particular probability. That is, i=0 is the index for the probability ($q_0$) associated with a person that had 0 impressions of the media (i.e., a frequency impression of 0), i=1 is the index for the probability ($q_1$) associated with a person that had 1 media impression (i.e., a frequency impression of 0), and so forth. The probabilities can run from i=0, . . . , I where I may be a finite number (e.g., 50, 100, etc.) or set to infinity. In Equation 1c, $UB_j$ and $LB_j$ correspond, respectively, to the upper and lower bounds for the jth frequency interval. Thus, for the second frequency interval 304 (e.g., j=2) in the illustrated example of FIG. 3, the lower bound (LB) is 10 while the upper bound (UB) is 24.

In Equation set 1, there are 2J+1 constraints to be satisfied, where J is the total number of separate frequency intervals (e.g., J=3 in the illustrated example of FIG. 3). Such constraints are specific to each demographic. That is, as mentioned above, the user-identified probability distribution analyzer 204 evaluates Equation set 1 a total of K separate times, where K is the total number of different demographics (e.g., K=2 in the illustrated example of FIG.

3), to determine the corresponding number of user-identified probability distributions Q corresponding to each demographic. As the process for each demographic is the same, the constraints will be described generically below without reference to the demographics.

The first constraint (corresponding to Equation 1b) provides that the entire distribution Q (i.e., all probabilities $q_i$) must sum to 100%. The remaining 2J constraints correspond to the unique audience sizes associated with each frequency interval (Equation 1c) and the impression counts associated with each frequency interval (Equation 1d). The constraints defined by Equation 1c provide that the total number of people defined by the distribution Q that are associated with each frequency interval must equal the unique audience size associated with corresponding frequency interval as reported by the database proprietor 106 (e.g., as indicated in the user-identified audience measurement data 300). Similarly, the constraints defined by Equation 1c provide that the total number of impressions associated with the people defined by the distribution Q in each frequency interval must equal the impression count associated with corresponding frequency interval as reported by the database proprietor 106.

In some examples, the user-identified probability distribution analyzer 204 determines the maximum entropy solution for Equation set 1 by directly solving for all probabilities using any suitable numerical method. In some examples, this is impractical or impossible because there may be an infinite number of probabilities (e.g., if I=infinity). Accordingly, in some examples, the user-identified probability distribution analyzer 204 solves the dual system in which an expression for any probability q can be obtained by Lagrange multipliers. More particularly, each constraint is associated with one Lagrange multiplier. Thus, any probability can be determined by solving for 2J+1 variables without having to directly solve for every possible probability. Where the number of probabilities can be significant (e.g., potentially infinite), solving for every probability is impractical, if not impossible. Example approaches disclosed herein overcome this problem by defining the system with a finite number of variables (and corresponding constraints) that can be solved much more efficiently than through an analysis of all probabilities individually.

For the maximum entropy analysis, there is a closed form expression for each probability $q_i$ that can be obtained directly from the formulation of the linear constraints. The closed form expression may also be used to directly calculate the sum of multiple probabilities corresponding to particular frequency interval, which further facilitates the efficient computation of aggregate audience metrics because the individual probabilities do not need to be separately determined and then subsequently summed. For purposes of notation, let $\lambda_0$ be the multiplier to satisfy the constraint defined by Equation 1b that the sum must be 100%, let $\lambda_j^{\{A\}}$ be the multiplier to satisfy the constraints defined by Equation 1c based on the unique audience sizes in each frequency interval, and let $\lambda_j^{\{R\}}$ be the multiplier to satisfy the constraints defined by Equation 1d based on the impression counts in each frequency interval. With these definitions, the solution for any probability $q_i$ can be expressed mathematically as follows:

$$q_i = \exp\left(\lambda_0^{\{Q\}} + \sum_{j=1}^{J} \lambda_j^{\{A\}}[i \in B_j] + \sum_{j=1}^{J} i\lambda_j^{\{R\}}[i \in B_j]\right) \quad (2)$$

where [i∈ $B_j$] corresponds to the Iverson bracket in which the value is 1 when i belongs to the jth frequency interval (including the set $B_j$ of impression frequencies) and is 0 under all other conditions. For example, with reference to FIG. 3, when i=11 (e.g., an impression frequency of 11) and j=1 (the first frequency interval 302), the output of the Iverson bracket would be 0 because the first frequency interval 302 is associated with frequencies from 1 to 9. By contrast, if j=2 in the above example, the output of the Iverson bracket would be 1. The superscript (Q) on the normalization multiplier $\lambda_0^{\{Q\}}$ in Equation 2 is provided to indicate the multiplier is associated with the user-identified probability distribution Q to distinguish it from a similar multiplier defined further below for a census probability distribution P. Equation 2 applies separately to each demographic. That is, there are different probabilities $q_i^{(k)}$ for each demographic (k) with different Lagrange multipliers. However, for the sake of simplicity, the notation for the (k) superscript shown in Equation set 1 has been omitted in Equation 2 and those that follow.

By way of example, the expression for $q_5$, corresponding to an impression frequency of 5 (which is in first frequency interval 302 of FIG. 3, e.g., j=1) would be $$q_5 = \exp(\lambda_0 + \lambda_1^{\{A\}} + 5\lambda_1^{\{R\}}) \quad (3)$$

Likewise, the expression for $q_{53}$, corresponding to an impression frequency of 53 (which is in third frequency interval 306 of FIG. 3, e.g., j=3) would be $$q_{53} = \exp(\lambda_0^{\{Q\}} + \lambda_3^{\{A\}} + 53\lambda_3^{\{R\}}) \quad (4)$$

As can be seen from a comparison of Equations 3 and 4, every probability has the same $\lambda_0$ term, but the other multipliers are indexed according to the frequency interval to which the index (i) belongs.

For computational simplicity, Equation 2 can be expressed in terms of one constant ($L_1$) plus i multiplied by a second constant ($L_2$) as follows:

$$q_i = \exp(L_1 + iL_2) \quad (5a)$$

where $$L_1 = \lambda_0^{(Q)} + \sum_{j=1}^{J} \lambda_j^{\{A\}}[i \in B_j] \quad (5b)$$

$$L_2 = \sum_{j=1}^{J} \lambda_j^{\{R\}}[i \in B_j] \quad (5c)$$

Defining the constants as shown in Equation set 5 facilitates writing a general problem with the constants ($L_1$, $L_2$) as inputs in a manner that enables the output to be either a specific probability or some combination of multiple probabilities (e.g., the sum of all probabilities within a particular frequency interval). That is, rather than calculating individual probabilities, probability statistics for aggregated audience sizes and/or impressions counts associated with the frequency intervals designated in the user-identified audience measurement data may be determined to directly solve for the 2J+1 multipliers. Furthermore, estimating a different distribution for the data may be efficiently determined by modifying the constants ($L_1$, $L_2$) for the estimates of the aggregate values for impressions and audience size corresponding to the different frequency intervals.

For example, assume the sum of probabilities corresponding to the second frequency interval 304 of FIG. 3 are to be calculated. This includes 15 different probabilities corresponding to impression frequencies ranging inclusively from 10 to 24 (e.g., i=10, 11, . . . , 24). While Equation 2 could be evaluated for each probability directly and then summed to arrive at the final value, the summation can be simplified using the constants ($L_1$, $L_2$) based on the fact that the Lagrange multipliers are the same for each probability because all probabilities correspond to the same frequency interval (that is, they are all associated with the same value for j). The summation of probabilities for any frequency interval may be expressed generically as follows:

$$\sum_{i=a}^{b} q_i = \sum_{i=a}^{b} \exp(L_1 + iL_2) \qquad (6)$$
$$= \frac{e^{L_2}\left(e^{aL_2} - e^{(b+1)L_2}\right)}{1 - e^{L_2}}$$

where a and b correspond to the lower and upper bounds ($LB_j$ and $UB_j$), respectively, of the corresponding frequency interval. Thus, Equation 6 is associated with the unique audience size associated with the second frequency interval 304 as proportioned by the corresponding universe estimate (associated with a particular demographic) as expressed in Equation 1c. For the second frequency interval 304 of FIG. 3, the variables in Equation 6 would be $a=10$ $b=24$ $L_1 = \lambda_0^{\{Q\}} + \lambda_2^{\{A\}}$ $L_2 = \lambda_2^{\{R\}}$ \qquad (7)

with the understanding that different Lagrange multipliers correspond to each separate demographic. As shown from equations 6 and 7, there are only two unknown variables ($\lambda_0^{\{Q\}}$ and $\lambda_2^{\{A\}}$) for the entire sum of 15 separate probabilities associated with the unique audience size in the second frequency interval 304. Expressions for the sum of the probabilities $q_i$ corresponding to each frequency interval may be similarly evaluated relative to the corresponding audience sizes for each interval with the only unknowns being other ones of the Lagrange multipliers associated with audience size ($\lambda_0^{\{Q\}}$, $\lambda_1^{\{A\}}$, $\lambda_2^{\{A\}}$, and $\lambda_3^{\{Q\}\{A\}}$).

Equation 6 can be simplified by defining $$\exp(L_1 + iL_2) = z_1 z_2^i \qquad (8)$$

where $z_1 = \exp(L_1)$ and $z_2 = \exp(L_2)$. The $z_1$ term is independent of the index and can, therefore, come out of the summation. Thus, giving $$\sum_{i=a}^{b} q_i = \sum_{i=a}^{b} z_1 z_2^i = \frac{z_1\left(z_2^a - z_2^{b+1}\right)}{1 - z_2} \qquad (9)$$

When $b \to \infty$, Equation 9 simplifies to $$\sum_{i=a}^{\infty} q_i = \sum_{i=a}^{\infty} z_1 z_2^i = \frac{z_1 z_2^a}{1 - z_2} \qquad (10)$$

Equation 6 may also be simplified in terms of the constants ($L_1$ and $L_2$) when $b \to \infty$ as follows:

$$\sum_{i=a}^{\infty} q_i = \sum_{i=a}^{\infty} \exp(L_1 + iL_2) = \frac{e^{L_1} e^{aL_2}}{1 - e^{L_2}} \qquad (11)$$

Equations 6-11 correspond to the sum of probabilities $q_i$, which directly relates to unique audience size as defined in Equation 1c. Similar equations may be expressed for the sum of the product of the impression index i and the probabilities $q_i$ on any particular frequency interval. In particular, in terms of the constants ($L_1$ and $L_2$), the summation may be expressed as follows:

$$\sum_{i=a}^{b} i q_i = \sum_{i=a}^{b} i\exp(L_1 + iL_2) = \qquad (12)$$
$$\frac{e^{L_1}\left((a + e^{L_2} - ae^{L_2})e^{aL_2} - (1 + b - be^{L_2})e^{(b+1)L_2}\right)}{(1 - e^{L_2})^2}$$

which may be simplified when $b \to \infty$ as follows:

$$\sum_{i=a}^{\infty} i q_i = \sum_{i=a}^{\infty} i\exp(L_1 + iL_2) = \frac{e^{L_1}(a + e^{L_2} - ae^{L_2})e^{aL_2}}{(1 - e^{L_2})^2} \qquad (13)$$

Simplifying Equation 12 with the z terms gives $$\sum_{i=a}^{b} i z_1 z_2^i = \frac{z_1\left((a + z_2 - az_2)z_2^a - (1 + b - bz_2)z_2^{b+1}\right)}{(1 - z_2)^2} \qquad (14)$$

which may be further simplified when $b \to \infty$ as follows:

$$\sum_{i=a}^{\infty} i z_1 z_2^i = \frac{z_1(a + z_2 - az_2)z_2^a}{(1 - z_2)^2} \qquad (15)$$

Equations 6 and 8-15 may be evaluated for each frequency interval designated in the user-identified audience measurement data 300 obtained from the database proprietor 106 to produce a system of nonlinear equations with 2J+1 unknown variables corresponding to the Lagrange multipliers associated with each of the constraints defined in connection with Equation set 1. As the Lagrange multipliers are real valued and unconstrained, the system of equations may be numerically solved using any suitable numerical method. In some examples, the evaluation of the system of equations by the user-identified probability distribution analyzer 204 may include a Hessian matrix to increase the speed at which a solution may be determined. Table 1 provides the actual values calculated for the Lagrange multipliers based on the audience measurement data shown in FIGS. 3 and 4.

TABLE 1

Solved System for User-Identified Distribution

| Multiplier | Demographic 1 | Demographic 2 |
|---|---|---|
| $\lambda_0^{\{Q\}}$ | −1.9519 | −1.4045 |
| $\lambda_1^{\{A\}}$ | −0.3240 | −1.1428 |
| $\lambda_2^{\{A\}}$ | −0.8038 | .1.7177 |
| $\lambda_3^{\{A\}}$ | −1.2160 | −1.5793 |

TABLE 1-continued

Solved System for User-Identified Distribution

| Multiplier | Demographic 1 | Demographic 2 |
|---|---|---|
| $\lambda_1^{\{R\}}$ | −0.1604 | −0.1503 |
| $\lambda_2^{\{R\}}$ | −0.0875 | −0.0646 |
| $\lambda_3^{\{R\}}$ | −0.0579 | −0.0636 |

As described above, the user-identified probability distribution analyzer 204 evaluates Equations 1-15 for each separate demographic. Thus, there is a total of (2J+1)×K unknowns for the system that need to be solved to fully define the user-identified audience measurement data 300 in terms of user-identified probability distributions $Q^{(k)}$ across all demographic divisions. In some examples, the user-identified probability distribution(s) solved for by the user-identified probability distribution analyzer 204 are used to determine a census probability distribution corresponding to the census audience measurement data based on information theory. In particular, the example census probability distribution analyzer 206 determines a census probability distribution that satisfies the principle of minimum cross entropy between the census distribution P and the user-identified distribution Q subject to constraints defined by the census audience measurement data 400 shown in FIG. 4. As used herein, a census probability distribution (identified by the symbol P) defines the probabilities ($p_i$) of different impression frequencies associated with a given person in a population of interest without regard to whether the individual is identifiable by the database proprietor 106. In some examples, the census probability distribution analyzer 206 determines separate census probability distributions corresponding to the separate demographics 308, 310.

The weighted minimum cross entropy analysis performed by the census probability distribution analyzer 204 may be expressed mathematically as solving the following equation:

$$\underset{\{P^{(k)}\}}{\text{minimize}}\ KL = \sum_{k=1}^{K} U^{(k)} \sum_{i=0}^{I} p_i^{(k)} \log\left(\frac{p_i^{(k)}}{q_i^{(k)}}\right) \qquad (16a)$$

subject to the following constraints:

$$\sum_{i=0}^{I} U^{(k)} p_i^{(k)} = U^{(k)} \forall\ k = \{1, 2, \ldots, K\} \qquad (16b)$$

$$\sum_{k=1}^{K} U^{(k)} \sum_{i=0}^{I} i p_i^{(k)} = T \qquad (16c)$$

where T corresponds to the census impressions 408 of FIG. 4 (e.g., the total number of impressions recorded for a particular media item associated with the census audience measurement data 400). All other variables are the same as described above.

The minimization problem of Equation set 16 is defined over the set of all probability distributions, with a separate distribution corresponding to each demographic division of the user-identified audience measurement data 300. This formulation indicates that the weighted Kullback-Leibler divergence (KL-divergence) between the census and user-identified distributions must be minimal across all distributions. As each distribution has the same cardinality of I (including the possibility of I=∞), there is no need to take the unequal length of distributions across the different distributions into account for the KL minimization.

In Equation set 16, there are K+1 constraints to be satisfied. The first K constraints (corresponding to Equation 16b) provide that the entire distribution P (i.e., all probabilities p) for each demographic must sum to 100% of the demographic universe estimate. As shown in Equation 16b, the probabilities associated with a particular demographic (k) are weighted by the estimated population corresponding to the particular demographic (e.g., weighted by $U^{(k)}$). The last constraint (corresponding to Equation 16c) provides that the total number of impressions, across all demographics associated with the separate census distributions P for each demographic, must equal the total number of census impressions 408 indicated in the census audience measurement data 400. As indicated, this last constraint extends across all demographics such that the analysis of the individual census distributions for each demographic are not independent but intricately linked together. Therefore, the demographic divisions must be taken into account such that Equation set 16 and the following equations will include the superscript (k) to identify the different demographics.

The inner sum in Equation 16c represents the expected value of impressions associated with the audience members corresponding to a given demographic. Multiplying the expected value of impressions by the universe estimate specific to the corresponding demographic (e.g., the first or second demographic universe estimates 404, 406 of FIG. 4) gives the total number of impressions associated with the particular demographic. The outer sum in Equation 16c involves summing the demographic specific impression counts across all demographics to arrive at the total census impressions 408. Thus, the last constraint corresponding to Equation 16c can be expressed in different forms such as $$\sum_{k=1}^{K} T^{(k)} = T \qquad (17)$$

which provides that the sum of total impressions for each demographic must equal the total census impressions 408. Alternatively, this constraint may be expressed as $$\sum_{k=1}^{K} \sum_{j=1}^{J} T_j^{(k)} = T \qquad (18)$$

which provides that the sum of total impressions for each frequency interval across all demographics must equal the total census impressions 408.

The solution for the weighted minimum cross entropy problem defined by Equation set 16 involves K+1 unknown Lagrange multipliers, with one multiplier corresponding to each constraint. For purposes of notation, let $\lambda_0^{(k)\{P\}}$ be the multiplier to satisfy the constraint defined by Equation 16b that the sum of probabilities for each demographic must be 100% of the demographic universe estimate, and let $\lambda^{\{T\}}$ be the multiplier to satisfy the constraints defined by Equation 16c that the sum of all impressions across all demographics equals the total census impressions. Notably, the multipliers include the superscript (k) to indicate that a different multiplier corresponds to each different demographic. Further, the superscript (P) indicates the multipliers correspond to the census distribution P and are distinguishable from the multipliers used in Equations 2-15 above in connection with the user-identified distribution Q. The last multiplier, $\lambda^{\{T\}}$, does not include a superscript for the demographic because the multiplier corresponds to the overall constraint of total impressions across all demographics. With these definitions, the solution for any probability $p_i$ can be expressed mathematically as follows:

$$p_i^{(k)} = q_i^{(k)} \exp(\lambda_0^{(k)\{P\}} + i\lambda^{\{T\}}) \qquad (20)$$

where $q_i^{(k)}$ is the solution from Equation 2 associated with the kth demographic for the ith impression.

Substituting Equation 2 (with the (k) superscript previously omitted reintroduced) into Equation 20 provides $$p_i^{(k)} = \exp\left(\lambda_0^{(k)\{Q\}} + \sum_{j=1}^{J}\lambda_j^{(k)\{A\}}[i \in B_j] + \sum_{j=1}^{J}i\lambda_j^{(k)\{R\}}[i \in B_j]\right) \ldots \qquad (22a)$$

$$\ldots \times \exp(\lambda_0^{(k)\{P\}} + i\lambda^{\{T\}})$$

$$= \exp(M_1 + iM_2)$$

where $M_1$ and $M_2$ are constants defined as $$M_1 = \left(\lambda_0^{(k)\{Q\}} + \sum_{j=1}^{J}\lambda_j^{(k)\{A\}}[i \in B_j]\right) + \lambda_0^{(k)\{P\}} \qquad (22b)$$

$$M_2 = \left(\sum_{j=1}^{J}\lambda_j^{(k)\{R\}}[i \in B_j]\right) + \lambda^{\{T\}} \qquad (22c)$$

In the Equations 22b and 22c, the only unknowns are the multipliers in the final term of each expression ($\lambda_0^{(k)\{P\}}$ and $\lambda^{\{T\}}$). All other variables in Equations 22b and 22c are known based on the previous analysis of the user-identified probability distribution analyzer 204 described above. While all prior information is important, the first term of Equation 22c indicates that it cannot be assumed that impressions are proportionally distributed according to the populations of each demographic because the term may differ not only from one demographic to another but also from one frequency interval to another. For example, one demographic population may have a smaller relative population than another demographic but have larger relative impression frequencies among the corresponding members of the population. The above equations take both factors into account.

Similar equations to Equations 6 and 8-15 may be derived to define another system of nonlinear equations with K+1 unknowns corresponding to the Lagrange multipliers noted above. The only difference between the newly derived equations and Equations 6 and 8-15 outlined above is that the user-identified probabilities $q_i$ are replaced with census probabilities $p_i$ and the constants $L_1$ and $L_2$ (defined in Equations 5b and 5c) are replaced with the constants $M_1$ and $M_2$ (defined in Equations 22b and 22c). Thus, for example, the summation of census probabilities for any frequency interval may be expressed generically (comparable to Equation 6) as follows:

$$\sum_{i=a}^{b}p_i = \sum_{i=a}^{b}\exp(M_1 + iM_2) \qquad (23)$$

$$= \frac{e^{M_2}\left(e^{aM_2} - e^{(b+1)M_2}\right)}{1 - e^{M_2}}$$

and the summation of the product of impression indices i and census probabilities $p_i$ on any particular frequency interval may be expressed (comparable to Equation 12) as follows:

$$\sum_{i=a}^{b}ip_i = \sum_{i=a}^{b}i\exp(M_1 + iM_2) \qquad (24)$$

$$= \frac{e^{M_1}\left((a + e^{M_2} - ae^{M_2})e^{aM_2} - (1 + b - be^{M_2})e^{(b+1)M_2}\right)}{(1 - e^{M_2})^2}$$

In some examples, once the system of linear equations are defined (based on the appropriate bounds for the different frequency intervals and the other known information is incorporated therein), the census probability distribution analyzer 206 may implement any suitable numerical method to solve the system. Table 2 provides the actual values calculated for the Lagrange multipliers based on the audience measurement data shown in FIGS. 3 and 4 and the user-identified distribution Q determined therefrom.

TABLE 2

| Solved System for Census Distribution | |
| --- | --- |
| Multiplier | Solved Value |
| $\lambda_0^{(1)\{P\}}$ | −0.13643 |
| $\lambda_0^{(2)\{P\}}$ | −0.12626 |
| $\lambda^{\{T\}}$ | 0.00963 |

In some examples, the census probability distribution analyzer 206 uses the values solved for each of the Lagrange multipliers to calculate the estimated unique audience size and/or impression counts for different frequency intervals and across different demographics for the census audience measurement data. In some examples, the census probability distribution analyzer 206 calculates such values for the same frequency intervals and the same demographic breakdown as designated in the user-identified audience measurement data 300 of FIG. 3. Actual values for the estimated census information 500 divided by frequency interval and demographic in this manner is illustrated in FIG. 5.

In some examples, the report generator 208 generates any suitable report conveying audience measurement information and estimated. In some examples, the reports include the estimated census information 500 as shown in FIG. 5. Additionally or alternatively, the report generator 208 may generate a report including information corresponding to the user-identified audience measurement data 300 of FIG. 3 and/or the census audience measurement data 400 of FIG. 4.

The methodology described above applies for any number of frequency intervals and any number of demographic divisions. In some examples, there may be a single demographic. That is, in some examples, the user-identified audience measurement data 300 may not be divided into different demographic groups. In such examples, the equations to determine the user-identified distribution are unchanged because, as noted above, the equations are independent of demographics. Thus, there is still 2J+1 variables (Lagrange multipliers) to solve for, but the process will only need to be completed once rather than repeated multiple times for each different demographic.

The equations to determine the census distribution for a single demographic scenario become somewhat simplified. In particular, the minimum cross-entropy problem can be expressed as follows:

$$\underset{P}{\text{minimize}} \; KL = \sum_{i=0}^{I} p_i \log\left(\frac{p_i}{q_i}\right) \quad (25a)$$

subject to the following constraints:

$$\sum_{i=0}^{I} p_i = 1 \quad (25b)$$

$$\sum_{i=0}^{I} i p_i = \frac{T}{U} \quad (25c)$$

This one demographic scenario requires only two Lagrange multipliers because there are only two constraints without the different demographics. The solution for any probability $p_i$ in a single demographic situation may be expressed as follows:

$$\begin{aligned} p_i &= q_i \exp\left(\lambda_0^{(P)} + i\lambda^{(T)}\right) \\ &= \exp\left(\lambda_0^{(Q)} + \sum_{j=1}^{J} \lambda_j^{(A)}[i \in B_j] + \sum_{j=1}^{J} i\lambda_j^{(R)}[i \in B_j]\right) \dots \\ &\quad \dots \times \exp\left(\lambda_0^{(P)} + i\lambda^{(T)}\right) \\ &= \exp(N_1 + iN_2) \end{aligned} \quad (26a)$$

where $N_1$ and $N_2$ are constants defined as $$N_1 = \left(\lambda_0^{(Q)} + \sum_{j=1}^{J} \lambda_j^{(A)}[i \in B_j]\right) + \lambda_0^{(P)} \quad (26b)$$

$$N_2 = \left(\sum_{j=1}^{J} \lambda_j^{(R)}[i \in B_j]\right) + \lambda^{(T)} \quad (26c)$$

With $N_1$ and $N_2$ the impression count for each individual frequency interval can be solved and the Lagrange multipliers numerically solved for such that $$\sum_{j=1}^{J} T_j = T \quad (27)$$

which can be more normalized by the universe estimate to be consistent with the probabilities analyzed in the previous equations as follows:

$$\sum_{j=1}^{J} \frac{T_j}{U} = \frac{T}{U} \quad (28)$$

From these equations the estimated census information can be determined as described above.

While an example manner of implementing the audience measurement analyzer 200 of FIGS. 1A and 1B is illustrated in FIG. 3, one or more of the elements, processes and/or devices illustrated in FIG. 3 may be combined, divided, re-arranged, omitted, eliminated and/or implemented in any other way. Further, the example audience measurement data collector 202, the example user-identified probability distribution analyzer 204, the example census probability distribution analyzer 206, the example report generator 208 and/or, more generally, the example audience measurement analyzer 200 of FIG. 2 may be implemented by hardware, software, firmware and/or any combination of hardware, software and/or firmware. Thus, for example, any of the example audience measurement data collector 202, the example user-identified probability distribution analyzer 204, the example census probability distribution analyzer 206, the example report generator 208, and/or, more generally, the example audience measurement analyzer 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audience measurement data collector 202, the example user-identified probability distribution analyzer 204, the example census probability distribution analyzer 206, and/or the example report generator 208 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement analyzer 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
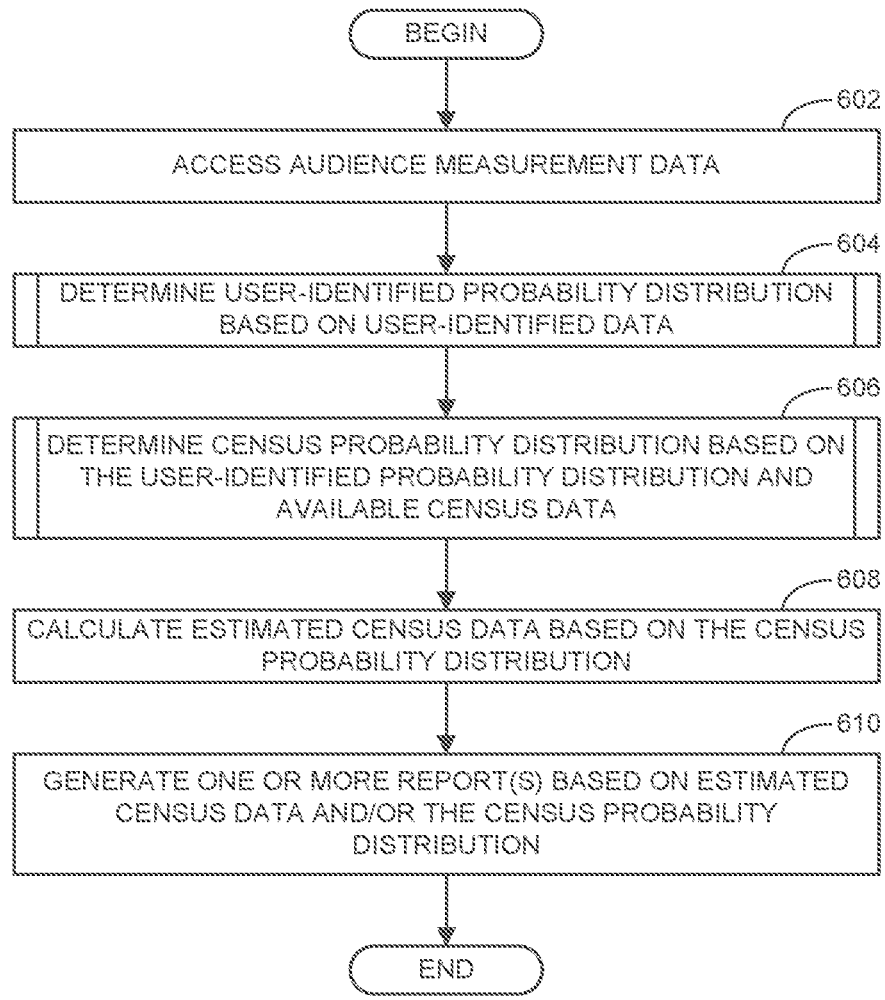
FIGS. 6-8 are flowcharts representative of machine readable instructions which may be executed to implement the example audience measurement analyzer of FIG. 2.
Figure 7:
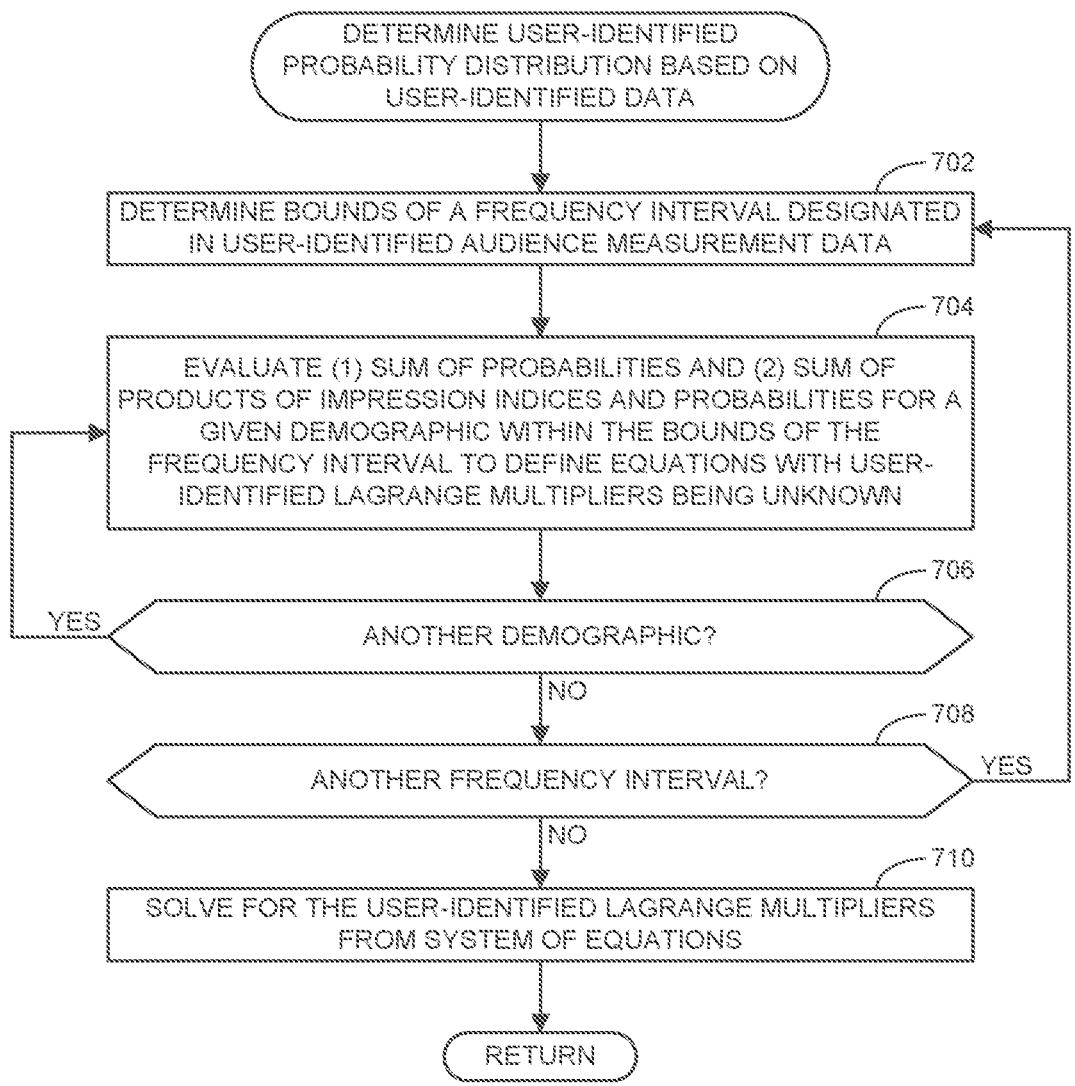
Figure 8:
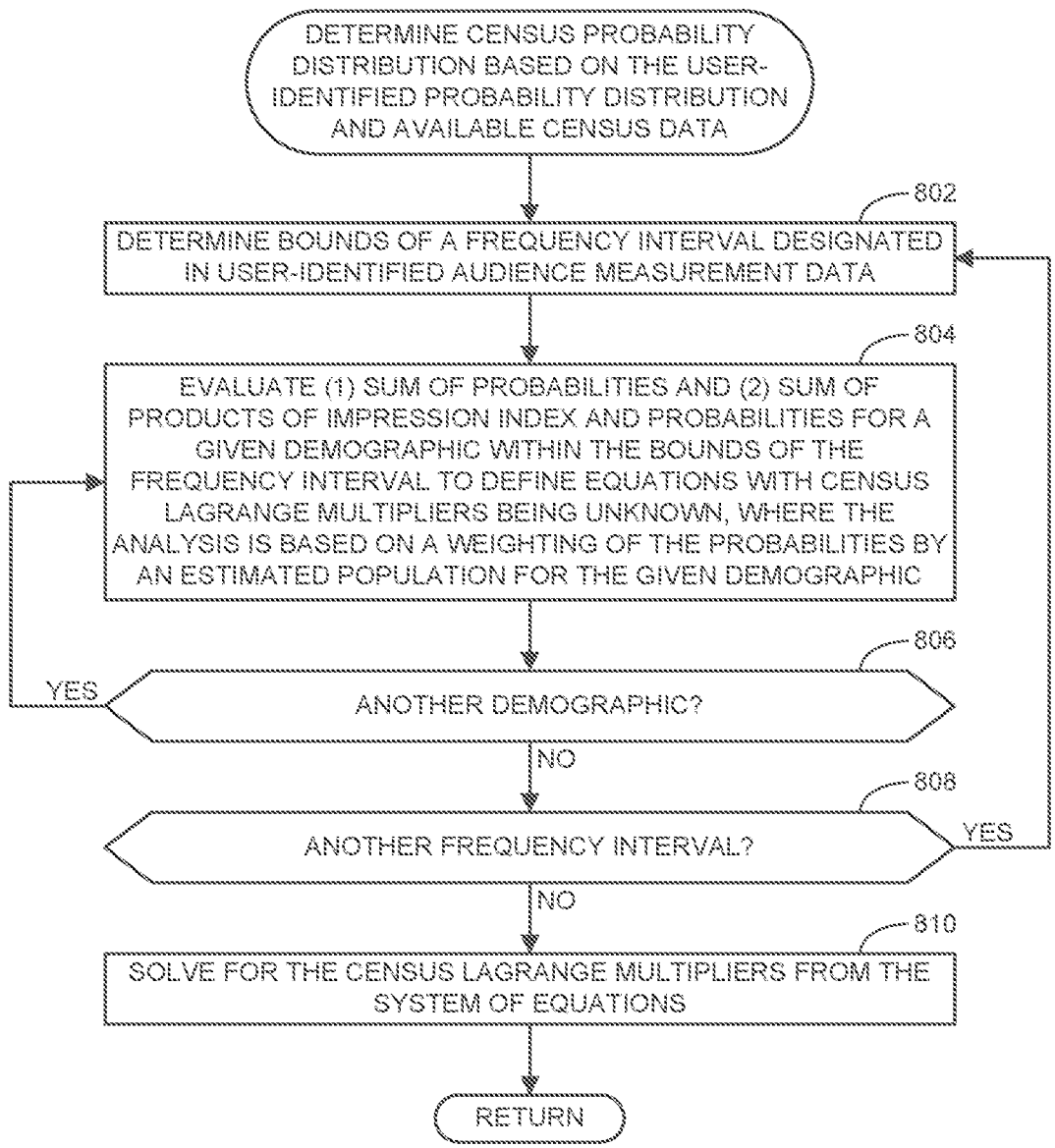

Flowcharts representative of example hardware logic or machine readable instructions for implementing the audience measurement analyzer 200 of FIG. 2 is shown in FIGS. 6-8. The machine readable instructions may be a program or portion of a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 6-8, many other methods of implementing the example audience measurement analyzer 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program of FIG. 6 begins at block 602 where the example audience measurement data collector 202 accesses audience measurement data. In some examples, the audience measurement data includes user-identified audience measurement data 300 and census audience measurement data 400. At block 604, the example user-identified probability distribution analyzer 204 determines a user-identified probability distribution based on the user-identified data. In some examples, the example user-identified probability distribution analyzer 204 determines a user-identified probability distribution at block 604 based on one or more ALUs 934 (e.g., of the processor 912 of FIG. 9, or any other processor) performing a series of calculations using the data in the volatile memory 914 stored by the MMU 936 and using Equations 6-15 to define a user-identified probability distribution. Further detail regarding the implementation of block 604 is provided below in connection with FIG. 7.

At block 606, the example census probability distribution analyzer 206 determines a census probability distribution based on the user-identified probability distribution and the available census data. For example, the census probability distribution analyzer 206 determines a census probability distribution at block 606 based on one or more ALUs 934 (e.g., of the processor 912 of FIG. 9, or any other processor) performing a series of calculations using the data in the volatile memory 914 stored by the MMU 936 and using derived equations similar to Equations 6-15 to define census probability distribution. Further detail regarding the implementation of block 606 is provided below in connection with FIG. 8. At block 608, the example census probability distribution analyzer 206 calculates estimated census data (e.g., the estimated census data 500 of FIG. 5) based on the census probability distribution. In some examples, the census probability distribution analyzer 206 calculates estimated census data based on one or more ALUs 934 (e.g., of the processor 912 of FIG. 9, or any other processor) performing a series of calculations using the data in the volatile memory 914 stored by the MMU 936. In some examples, the estimated census data includes impression counts and unique audience size estimates for particular frequency intervals across different demographics. In some examples, the division of frequency intervals and demographics corresponds to what was designated in the user-identified audience measurement data. At block 610, the example report generator 208 generates one or more report(s) based on the estimated census data and/or the census probability distribution. Thereafter, the example process of FIG. 6 ends.

FIG. 7 is a flowchart representative of hardware logic or machine readable instructions for implementing block 604 of FIG. 6. The process of FIG. 7 begins at block 702 where the example user-identified probability distribution analyzer 204 determines bounds of a frequency interval designated in the user-identified audience measurement data. At block 704, the example user-identified probability distribution analyzer 204 evaluates (1) the sum of probabilities and (2) the sum of products of impression indices and probabilities for a given demographic within the bounds of the frequency interval to define equations with user-identified Lagrange multipliers being unknown. That is, the result of the evaluation at block 704 produces equations used in the system of equations that are to be numerically solved for the different Lagrange multipliers. In some examples, the expression of the sums mentioned at block 704 correspond to Equations 6-15 evaluated relative to the constraints defined in Equation set 5.

At block 706, the example user-identified probability distribution analyzer 204 determines whether there is another demographic to evaluate. If so, control returns to block 704 to define additional equations with the user-identified Lagrange multipliers as unknown variables. If there are no more demographics to evaluate, control advances to block 708 where the example user-identified probability distribution analyzer 204 determines whether there is another frequency interval. If so, control returns to block 702 to repeat the process. Once all frequency intervals have been evaluated across all demographics, the full system of equations to solve for the user-identified Lagrange multipliers will be defined. Accordingly, at block 710, the example user-identified probability distribution analyzer 204 solves for the user-identified Lagrange multipliers from the system of equations. Having solved for the user-identified Lagrange multipliers, the user-identified probability distribution is now fully defined. As such, the process of FIG. 7 ends and returns to complete the process of FIG. 6.

FIG. 8 is a flowchart representative of hardware logic or machine readable instructions for implementing block 606 of FIG. 6. The process of FIG. 8 begins at block 802 where the example census probability distribution analyzer 206 determines bounds of a frequency interval designated in the user-identified audience measurement data. At block 804, the example census probability distribution analyzer 206 evaluates (1) the sum of probabilities and (2) the sum of products of impression indices and probabilities for a given demographic within the bounds of the frequency interval to define equations with census Lagrange multipliers being unknown, where the analysis is based on a weighting of the probabilities by an estimated population for the given demographic. That is, the result of the evaluation at block 804 produces equations used in the system of equations that are to be numerically solved for the different Lagrange multipliers. In some examples, the expression of the sums mentioned at block 804 correspond to Equations 23 and 24 evaluated relative to the constraints defined in Equation set 16, which includes the estimated demographic population weighting factor ($U^{(k)}$) in Equation 16b.

At block 806, the example census probability distribution analyzer 206 determines whether there is another demographic to evaluate. If so, control returns to block 804 to define additional equations with the census Lagrange multipliers as unknown variables. If there are no more demographics to evaluate, control advances to block 808 where the example census probability distribution analyzer 206 determines whether there is another frequency interval. If so, control returns to block 802 to repeat the process. Once all frequency intervals have been evaluated across all demographics, the full system of equations to solve for the census Lagrange multipliers will be defined. Accordingly, at block 810, the example census probability distribution analyzer 206 solves for the census Lagrange multipliers from the system of equations. Having solved for the user-identified Lagrange multipliers, the user-identified probability distribution is now fully defined. As such, the process of FIG. 8 ends and returns to complete the process of FIG. 6.

Figure 9:
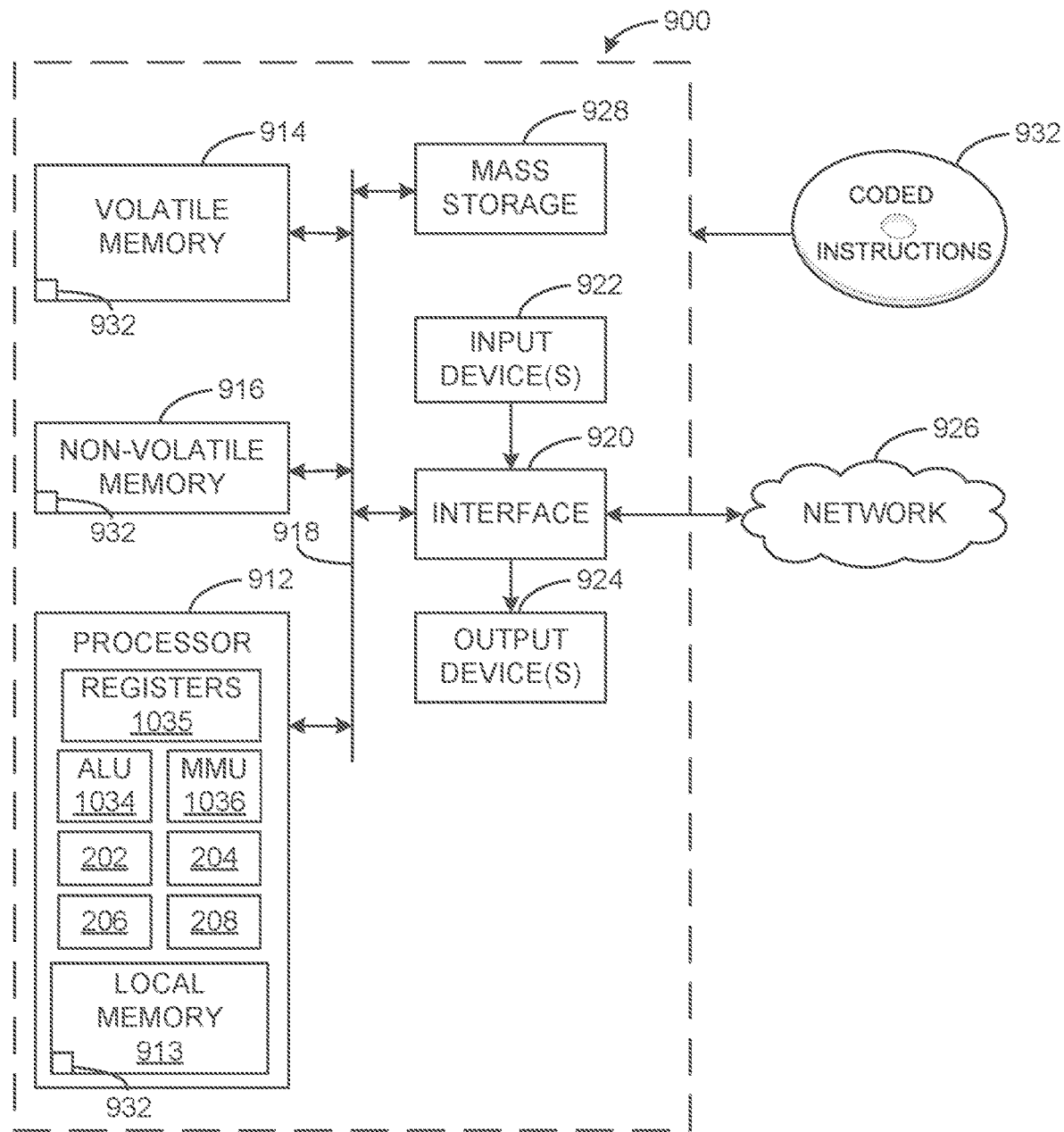
FIG. 9 is a block diagram of an example processing platform structured to execute the instructions of FIGS. 6-8 to implement the example audience measurement analyzer of FIG. 2.

FIG. 9 is a block diagram of an example processor platform 900 structured to execute the instructions of FIGS. 6-8 to implement the audience measurement analyzer 200 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. The example processor 912 includes at least one arithmetic logic unit 934 to perform arithmetic, logical, and/or comparative operations on data in registers 935. The example processor also includes a memory management unit 936 to load values between local memory 913 (e.g., a cache) and the registers 935 and to request blocks of memory from a volatile memory 914 and a non-volatile memory 916. In this example, the processor implements example audience measurement data collector 202, the example user-identified probability distribution analyzer 204, the example census probability distribution analyzer 206, and the example report generator 208.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that enable the estimation of media impression frequency distributions across different demographics within different frequency intervals for all impressions (i.e., census impressions) recorded for media being monitored. The total number of census impressions may be determined from monitored information collected in connection with cookies stored on client devices that report access to tagged media. While the cookie information may enable the number of impressions associated with each cookie (e.g., a cookie frequency), there is no way to directly determine the number of impressions or the associated number of audience members (i.e., unique audience size) because one or more of the cookies may be associated with the same person. Database proprietors may contain user profile information tied to specific cookie information such that specific individuals can be matched to particular impressions of media. However, at least some portion of the media audience is likely to correspond to individuals who the database proprietor is unable to recognize. Examples disclosed herein overcome this issue to estimate an impression frequency distribution for media across all individuals of an audience based on a user-identified audience measurement data corresponding to person that the database proprietor recognizes and census-wide impression data. Furthermore, examples disclosed herein enable the calculation of such distributions for different frequency intervals across multiple demographics without directly calculating individual probabilities for the distributions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A processor system comprising:
   interface circuitry to transmit of first network communications to computing devices, the first network communications including cookies to be set on the computing devices, the cookies to facilitate tracking of accesses to media at the computing devices; and
   processor circuitry including one or more of:
      at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the processor system;
      a Field Programmable Gate Array (FPGA), the FPGA including first logic gate circuitry, a plurality of configurable interconnections, and storage circuitry, the first logic gate circuitry and the plurality of the configurable interconnections to perform one or more second operations, the storage circuitry to store a result of the one or more second operations; or
      Application Specific Integrated Circuitry (ASIC) including second logic gate circuitry to perform one or more third operations;
   the processor circuitry to perform at least one of the first operations, the second operations, or the third operations to instantiate:
      audience measurement data collector circuitry to:
         log first media impressions at a first server of an audience measurement entity based on first requests received from second network communications from first ones of the computing devices, the first media impressions corresponding to user-identified impressions, the second network communications triggered by media collection instructions executed by the first ones of the computing devices that accessed the media, the interface circuitry to transmit redirect communications to instruct the first ones of the computing devices to send third network communications to a second server of a database proprietor, the third network communications indicative of the accesses to the media at the first ones of the computing devices;
         log second media impressions at the first server based on second requests received from fourth network communications from second ones of the computing devices, the fourth network communications triggered by the media collection instructions executed by the second ones of the computing devices that accessed the media, a total count of the first and second requests corresponding to a total number of census impressions associated with the media, the second media impressions corresponding to unidentified impressions, the first and second requests including cookie information associated with the cookies set on the computing devices, the cookie information insufficient by itself to indicate census impression counts for different impression frequency intervals associated with the census impressions; and
         store user-identified impression data corresponding to the user-identified impressions, the user-identified impressions obtained via a fifth network communication from the second server of the database proprietor, the user-identified impressions generated by the database proprietor based on data aggregated from the third network communications from the first ones of the computing devices, the user-identified impressions associated with user-identified individuals for whom first demographic information is stored by the database proprietor, the user-identified impression data including a plurality of user-identified impression counts associated with corresponding ones of the impression frequency intervals;
      user-identified probability distribution analyzer circuitry to determine multipliers that relate a first probability distribution for the user-identified impressions to a second probability distribution for the census impressions, the multipliers based on census constraints defined by the total number of census impressions, determination of the multipliers to improve a computational efficiency of the processor system by eliminating a need to directly solve for all probabilities in the second probability distribution;
      census probability distribution analyzer circuitry to determine the census impression counts associated with the census impressions based on the multipliers, different ones of the census impression counts corresponding to different ones of the impression frequency intervals; and
      report generator circuitry to generate a report based on the different ones of the census impression counts.

2. The processor system of claim 1, wherein the census impressions are associated with media accessed by members of a national population.

3. The processor system of claim 1, wherein the census probability distribution analyzer circuitry is to determine different ones of the census impressions according to different demographics.

4. The processor system of claim 1, wherein the user-identified probability distribution analyzer circuitry is to identify a distribution that satisfies a principle of maximum entropy with respect to the user-identified impressions subject to user-identified constraints defined by the user-identified impression data, the first probability distribution determined based on the identified distribution.

5. The processor system of claim 1, wherein the audience measurement data collector circuitry is to store user-identified audience size data including different ones of a plurality of first unique audience sizes associated with different ones of the plurality of user-identified impression counts, the census probability distribution analyzer circuitry to determine, based on the multipliers, a plurality of second unique audience sizes corresponding to audience members associated with the census impression counts, different ones of the plurality of second unique audience sizes corresponding to different ones of the impression frequency intervals.

6. The processor system of claim 1, wherein the multipliers are Lagrange multipliers.

7. The processor system of claim 1, wherein the census constraints are defined by weighted probabilities associated with the second probability distribution, different ones of the probabilities weighted based on estimated populations for corresponding ones of different demographics, the weighted probabilities associated with the second probability distribution correspond to a weighted KL divergence Kullback-Leibler divergence.

8. The processor system of claim 1, wherein the processor circuitry includes at least the Application Specific Integrated Circuitry (ASIC), and wherein the processor circuitry is to perform at least the third operations.

9. An apparatus, comprising:
  means for communicating to:
    transmit first network communications to computing devices, the first network communications including cookies to be set on the computing devices, the cookies to facilitate tracking of accesses to media at the computing devices;
  means for storing to:
    store first records corresponding to first media impressions reported in second network communications from first ones of the computing devices, the first media impressions corresponding to user-identified impressions, the second network communications triggered by media collection instructions executed by the first ones of the computing devices that accessed the media, the communicating means to transmit redirect communications to instruct the first ones of the computing devices to send third network communications to a server of a database proprietor, the third network communications indicative of the accesses to the media at the first ones of the computing devices;
    store second records corresponding to second media impressions reported in fourth network communications from second ones of the computing devices, the fourth network communications triggered by the media collection instructions executed by the second ones of the computing devices that accessed the media, a total count of the first and second requests corresponding to a total number of census impressions associated with the media, the second media impressions corresponding to unidentified impressions, the first and second requests including cookie information associated with the cookies set on the computing devices, the cookie information insufficient by itself to indicate census impression counts for different impression frequency intervals associated with the census impressions; and
    store user-identified impression data corresponding to the user-identified impressions, the user-identified impressions obtained via a fifth network communication from the server of the database proprietor, the user-identified impressions generated by the database proprietor based on data aggregated from the third network communications from the first ones of the computing devices, the user-identified impressions associated with user-identified individuals for whom first demographic information is stored by the database proprietor, the user-identified impression data including a plurality of user-identified impression counts associated with corresponding ones of the impression frequency intervals; and
  means for processing data to:
    determine multipliers that relate a first probability distribution for the user-identified impressions to a second probability distribution for the census impressions, the multipliers based on census constraints defined by the total number of census impressions, determination of the multipliers to improve a computational efficiency of the processing means by eliminating a need to directly solve for all probabilities in the second probability distribution;
    determine the census impression counts associated with the census impressions based on the multipliers, different ones of the census impression counts corresponding to different ones of the impression frequency intervals; and
    generate a report based on the different ones of the census impression counts.

10. The apparatus of claim 9, wherein the census impressions are associated with media accessed by members of a national population.

11. The apparatus of claim 9, wherein the processing means is to determine different ones of the census impressions according to different demographics.

12. The apparatus of claim 9, wherein the processing means is to identify a distribution that satisfies a principle of maximum entropy with respect to the user-identified impressions subject to user-identified constraints defined by the user-identified impression data, the first probability distribution determined based on the identified distribution.

13. The apparatus of claim 9, wherein the storing means is to store user-identified audience size data including different ones of a plurality of first unique audience sizes associated with different ones of the plurality of user-identified impression counts, the processing means to determine, based on the multipliers, a plurality of second unique audience sizes corresponding to audience members associated with the census impression counts, different ones of the plurality of second unique audience sizes corresponding to different ones of the impression frequency intervals.

14. The apparatus of claim 9, wherein the multipliers are Lagrange multipliers.

15. The apparatus of claim 9, wherein the census constraints are defined by weighted probabilities associated with the second probability distribution, different ones of the probabilities weighted based on estimated populations for corresponding ones of different demographics, the weighted probabilities associated with the second probability distribution correspond to a weighted Kullback-Leibler divergence.

16. A processor system, comprising:
  memory;
  communication circuitry to transmit first network communications to computing devices, the first network communications including cookies to be set on the computing devices, the cookies to facilitate tracking of accesses to media at the computing devices;
  instructions; and
  programmable circuitry to be programmed by the instructions to:
    cause storing of first records in the memory, the first records corresponding to first media impressions reported in second network communications from first ones of the computing devices, the first media impressions corresponding to user-identified impressions, the second network communications triggered by media collection instructions executed by the first ones of the computing devices that accessed the media, the communication circuitry to transmit redirect communications to instruct the first ones of the computing devices to send third network communications to a server of a database proprietor, the third network communications indicative of the accesses to the media at the first ones of the computing devices;

cause storing of second records in the memory, the second records corresponding to second media impressions reported in fourth network communications from second ones of the computing devices, the fourth network communications triggered by the media collection instructions executed by the second ones of the computing devices that accessed the media, a total count of the first and second requests corresponding to a total number of census impressions associated with the media, the second media impressions corresponding to unidentified impressions, the first and second requests including cookie information associated with the cookies set on the computing devices, the cookie information insufficient by itself to indicate census impression counts for different impression frequency intervals associated with the census impressions;

cause storing of user-identified impression data in the memory, the user-identified impression data corresponding to the user-identified impressions, the user-identified impressions obtained via a fifth network communication from the server of the database proprietor, the user-identified impressions generated by the database proprietor based on data aggregated from the third network communications from the first ones of the computing devices, the user-identified impressions associated with user-identified individuals for whom first demographic information is stored by the database proprietor, the user-identified impression data including a plurality of user-identified impression counts associated with corresponding ones of the impression frequency intervals;

determine multipliers that relate a first probability distribution for the user-identified impressions to a second probability distribution for the census impressions, the multipliers based on census constraints defined by the total number of census impressions, determination of the multipliers to improve a computational efficiency of the processor system by eliminating a need to directly solve for all probabilities in the second probability distribution;

determine the census impression counts associated with the census impressions based on the multipliers, different ones of the census impression counts corresponding to different ones of the impression frequency intervals; and facilitate generation of a report based on the different ones of the census impression counts.

17. The processor system of claim 16, wherein the census impressions are associated with media accessed by members of a national population.

18. The processor system of claim 16, wherein the programmable circuitry is to determine different ones of the census impressions according to different demographics.

19. The processor system of claim 16, wherein the programmable circuitry is to identify a distribution that satisfies a principle of maximum entropy with respect to the user-identified impressions subject to user-identified constraints defined by the user-identified impression data, the first probability distribution determined based on the identified distribution.

20. The processor system of claim 16, wherein the programmable circuitry is to:

cause storing of user-identified audience size data in the memory, the user-identified audience size data including different ones of a plurality of first unique audience sizes associated with different ones of the plurality of user-identified impression counts; and determine, based on the multipliers, a plurality of second unique audience sizes corresponding to audience members associated with the census impression counts, different ones of the plurality of second unique audience sizes corresponding to different ones of the impression frequency intervals.

21. The processor system of claim 16, wherein the census constraints are defined by weighted probabilities associated with the second probability distribution, different ones of the probabilities weighted based on estimated populations for corresponding ones of different demographics, the weighted probabilities associated with the second probability distribution correspond to a weighted Kullback-Leibler divergence.

* * * * *